(12) United States Patent
Lee et al.

(10) Patent No.: US 11,466,128 B2
(45) Date of Patent: Oct. 11, 2022

(54) SUPERABSORBENT POLYMER AND PREPARATION METHOD THEREOF

(71) Applicant: LG Chem, Ltd., Seoul (KR)

(72) Inventors: Yong Hun Lee, Daejeon (KR); Mookon Kim, Daejeon (KR); Dae Woo Nam, Daejeon (KR); Hyemi Nam, Daejeon (KR); Sang Gi Lee, Daejeon (KR); Chang Hun Lee, Daejeon (KR); Jiyoon Jeong, Daejeon (KR); Chang Hun Han, Daejeon (KR)

(73) Assignee: LG Chem, Ltd.

(*) Notice: Subject to any disclaimer, the term of this patent is extended or adjusted under 35 U.S.C. 154(b) by 188 days.

(21) Appl. No.: 16/649,341

(22) PCT Filed: Jun. 11, 2019

(86) PCT No.: PCT/KR2019/007016
§ 371 (c)(1),
(2) Date: Mar. 20, 2020

(87) PCT Pub. No.: WO2020/111421
PCT Pub. Date: Jun. 4, 2020

(65) Prior Publication Data
US 2021/0040271 A1    Feb. 11, 2021

(30) Foreign Application Priority Data

Nov. 26, 2018 (KR) .................. 10-2018-0147749
Jun. 10, 2019 (KR) .................. 10-2019-0068112

(51) Int. Cl.
| | | |
|---|---|---|
| C08J 3/075 | (2006.01) | |
| C08K 3/011 | (2018.01) | |
| C08J 3/12 | (2006.01) | |
| C08J 3/24 | (2006.01) | |
| C08J 9/04 | (2006.01) | |
| C08L 23/06 | (2006.01) | |
| C08L 33/02 | (2006.01) | |

(52) U.S. Cl.
CPC .............. *C08J 3/075* (2013.01); *C08J 3/12* (2013.01); *C08J 3/24* (2013.01); *C08J 9/04* (2013.01); *C08K 3/011* (2018.01); *C08L 23/06* (2013.01); *C08L 33/02* (2013.01); *C08J 2300/14* (2013.01)

(58) Field of Classification Search
CPC ........................................................ C08J 3/075
See application file for complete search history.

(56) References Cited

U.S. PATENT DOCUMENTS

| | | | |
|---|---|---|---|
| 6,376,581 B1 | 4/2002 | Tanaka et al. | |
| 6,605,673 B1 | 8/2003 | Mertens et al. | |
| 2003/0207997 A1 | 11/2003 | Mertens et al. | |
| 2007/0129495 A1 | 6/2007 | Mertens et al. | |
| 2007/0135554 A1 | 6/2007 | McIntosh et al. | |
| 2007/0238806 A1 | 10/2007 | Mitsukami et al. | |
| 2008/0027180 A1 | 1/2008 | Higashimoto et al. | |
| 2009/0298963 A1 | 12/2009 | Matsumoto et al. | |
| 2017/0015798 A1 | 1/2017 | Lee et al. | |
| 2017/0066862 A1 | 3/2017 | Matsumoto et al. | |
| 2017/0114192 A1 | 4/2017 | Kim et al. | |
| 2018/0185819 A1 | 7/2018 | Ahn et al. | |
| 2018/0265653 A1 | 9/2018 | Lee et al. | |
| 2018/0304232 A1 | 10/2018 | Nam et al. | |
| 2018/0318793 A1 | 11/2018 | Yoon et al. | |
| 2019/0099739 A1 | 4/2019 | Lee et al. | |

FOREIGN PATENT DOCUMENTS

| | | |
|---|---|---|
| CN | 106164099 A | 11/2016 |
| CN | 108026290 A | 5/2018 |
| EP | 3101038 A1 | 12/2016 |
| EP | 3342801 A1 | 7/2018 |
| EP | 3345958 A1 | 7/2018 |
| JP | 2555159 B2 | 11/1996 |
| JP | 2003105092 A | 4/2003 |
| JP | 2008523197 A | 7/2008 |
| JP | 2009519356 A | 5/2009 |
| JP | 2009532567 A | 9/2009 |
| KR | 20070108281 A | 11/2007 |
| KR | 20100040247 A | 4/2010 |
| KR | 101371932 B1 | 3/2014 |
| KR | 20150143167 A | 12/2015 |
| KR | 20160128350 A | 11/2016 |
| KR | 20180074384 A | 7/2018 |
| WO | 2016085294 A1 | 6/2016 |

OTHER PUBLICATIONS

English Machine Translation KR2010004027 obtained Jan. 20, 2022 at http://translationportal.epo.org/emtp/translate/?ACTION=description-retrieval&COUNTRY=KR&ENGINE=google&FORMAT=docdb&KIND=A&LOCALE=en_EP&NUMBER=20100040247&OPS=ops.epo.org/3.2&SRCLANG=ko&TRGLANG=en (Year: 2010).*

Extended European Search Report including Written Opinion for EP19849011.2 dated Oct. 23, 2020; 7 pages.

Chang, Sooho, et al., "Multi-scale Characterization of Surface-Crosslinked Superabsorbent Polymer Hydrogel Spheres", Polymer, available online Apr. 2018, 31 pages, vol. 145.

Search report from International Application No. PCT/KR2019/007016, dated Oct. 7, 2019.

(Continued)

*Primary Examiner* — Arrie L Reuther

(74) *Attorney, Agent, or Firm* — Lerner, David, Littenberg, Krumholz & Mentlik, LLP

(57) ABSTRACT

A superabsorbent polymer having optimized gel strength and exhibiting an improved absorption rate without increasing a specific surface area by chemical foaming or a physical method, and a preparation method thereof, are provided.

15 Claims, No Drawings

(56) References Cited

OTHER PUBLICATIONS

Odian, George, "Principles of Polymerization." Second Edition, 1981, John Wiley & Sons, Inc., p. 203.
Schwalm, Reinhold, "UV Coatings: Basics, Recent Developments and New Applications." Elsevier Science, Dec. 21, 2006, p. 115.

* cited by examiner

SUPERABSORBENT POLYMER AND PREPARATION METHOD THEREOF

CROSS-REFERENCE TO RELATED APPLICATION(S)

The present application is a national phase entry under 35 U.S.C. § 371 of International Application No. PCT/KR2019/007016, filed on Jun. 11, 2019, which claims priority from Korean Patent Application No. 10-2018-0147749, filed on Nov. 26, 2018 and Korean Patent No. 10-2019-0068112, filed on Jun. 10, 2019, the disclosures of which are hereby incorporated by reference herein in their entirety.

TECHNICAL FIELD

The present invention relates to a superabsorbent polymer exhibiting an improved absorption rate without increasing a specific surface area by chemical foaming or a physical method, and a preparation method thereof.

BACKGROUND ART

A superabsorbent polymer (SAP) is a synthetic polymeric material capable of absorbing moisture from 500 to 1000 times its own weight. Various manufacturers have called it by different names, such as SAM (Super Absorbency Material), AGM (Absorbent Gel Material), etc. Since such superabsorbent polymers started to be practically applied in sanitary products, now they are being widely used not only for hygiene products such as disposable diapers for children, etc., but also for water retaining soil products for gardening, water stop materials for civil engineering and construction, sheets for raising seedlings, fresh-keeping agents for food distribution fields, materials for poultice, and the like.

These superabsorbent polymers are most widely used in sanitary materials such as diapers, sanitary pads, etc. In the sanitary materials, the superabsorbent polymer is generally distributed throughout pulp. Recently, continuous efforts have been made to provide thinner sanitary materials such as diapers having a thinner thickness, etc., and as part of that, diapers having a reduced content of pulp, and furthermore, diapers having no pulp, so-called pulpless diapers, are actively under development.

Such a sanitary material having a reduced content of pulp or having no pulp includes the superabsorbent polymer at a relatively high ratio. In this case, the superabsorbent polymer particles are inevitably included as multiple layers in the sanitary materials. In order to allow superabsorbent polymer particles included in multiple layers to more efficiently absorb a liquid such as urine, it is necessary for the superabsorbent polymer to basically exhibit high absorption performance and absorption rate.

Recently, continuous attempts have been made to prepare and provide superabsorbent polymers exhibiting a more improved absorption rate.

As a method of increasing the absorption rate of the superabsorbent polymer, a method of increasing a specific surface area of the superabsorbent polymer through chemical foaming using a carbonate-based foaming agent, etc., or by reducing the size of crumb particles by applying a physical force to a polymer gel, has been proposed.

However, as the specific surface area of the superabsorbent polymer increases, it is difficult to perform uniform surface-crosslinking, and as a result, there is a problem in that absorbency under pressure and permeability are reduced. Further, during the process of improving the specific surface area, generation of fine particles is increased to reduce productivity, and a bulk density of the superabsorbent polymer is reduced while increasing the specific surface area, and thus there is a problem in that commercialization is difficult.

Accordingly, there is a continuous demand to develop a technology capable of further improving the absorption rate of the superabsorbent polymer without increasing the specific surface area by chemical foaming or a physical method.

DETAILED DESCRIPTION OF THE INVENTION

Technical Problem

Accordingly, the present invention provides a superabsorbent polymer having optimized gel strength and an improved absorption rate without increasing its specific surface area by chemical foaming or a physical method, and a preparation method thereof.

According to one embodiment of the present invention, provided is a superabsorbent polymer having gel strength of 8500 Pa to 10,500 Pa, as measured using a rheometer after being swollen with a 0.9 wt % physiological saline solution for 1 hour, the superabsorbent polymer including: a base polymer powder including a first crosslinked polymer of a water-soluble ethylene-based unsaturated monomer having acidic groups which are at least partially neutralized; and a surface-crosslinked layer which is located on the base polymer powder, and includes a second crosslinked polymer obtained by further crosslinking the first crosslinked polymer via alkylene carbonate and a polycarboxylic acid-based copolymer, wherein the first crosslinked polymer has a neutralization degree of 70 mol % or less, and the second crosslinked polymer includes acidic groups which are neutralized with potassium salts and has a neutralization degree of more than 70 mol % and less than 100 mol %.

According to another embodiment of the present invention, provided is a superabsorbent polymer including a base polymer powder including: a first crosslinked polymer of a water-soluble ethylene-based unsaturated monomer having acidic groups which are at least partially neutralized; and a surface-crosslinked layer which is located on the base polymer powder and includes a second crosslinked polymer obtained by further crosslinking the first crosslinked polymer via a surface crosslinking agent, wherein a content of particles having a particle size of 150 μm to 850 μm is 99% by weight or more, with respect to a total weight of the superabsorbent polymer, AUP (0.7 psi) for a 0.9 wt % physiological saline solution is 22 g/g to 25 g/g, CRC for the 0.9 wt % physiological saline solution is 29 g/g to 33 g/g, and gel strength is 8500 Pa to 10,500 Pa, as measured using a rheometer after being swollen with the 0.9 wt % physiological saline solution for 1 hour.

According to still another embodiment of the present invention, provided is a method of preparing a superabsorbent polymer, the method including the steps of: performing crosslinking polymerization of a water-soluble ethylene-based unsaturated monomer having acidic groups which are at least partially neutralized, in the presence of an internal crosslinking agent, to form a water-containing gel polymer including a first crosslinked polymer having a neutralization degree of 70 mol % or less; drying, pulverizing, and size-sorting the water-containing gel crosslinked polymer to form a base polymer powder; and reacting the base polymer powder with a surface crosslinking solution which is prepared by dissolving a surface crosslinking agent containing potassium hydroxide, the alkylene carbonate, and the polycarboxylic acid-based copolymer in water to form a surface-crosslinked layer including a second crosslinked polymer obtained by further crosslinking the first crosslinked polymer on the surface of the base polymer powder via the alkylene carbonate, wherein the water is used in an amount of 2.5 parts by weight to 10 parts by weight, with respect to 100 parts by weight of the base polymer powder, and the potassium hydroxide, the alkylene carbonate, and the polycarboxylic acid-based copolymer are used in amounts satisfying the conditions of the following Equation 1:

$$0.05 < a/((b \times d) - c) \leq 1 \quad \text{[Equation 1]}$$

wherein, in Equation 1, a is a number of moles of alkylene carbonate to be used, b is a number of moles of acidic group present in the first crosslinked polymer, c is a number of moles of the potassium hydroxide to be used, and d is a volume ratio of the surface-crosslinked layer with respect to a total volume of the superabsorbent polymer, provided that a and c satisfy the condition of $1 < a/c < 20$.

Hereinafter, a superabsorbent polymer and a preparation method thereof according to specific embodiments of the present invention will be described in more detail. However, these are for illustrative purposes only, and the scope of the present invention is not intended to be limited thereby. It is apparent to those skilled in the art that various modifications of embodiments are possible without departing from the scope of the present invention.

Additionally, the term "including" or "containing" means that it includes a particular component (or element) without particular limitations unless otherwise mentioned throughout the present disclosure, and it cannot be interpreted as excluding the addition of other components (elements).

As a result of continuous experiments, the present inventors found that when a mixture containing potassium hydroxide, alkylene carbonate, and a polycarboxylic acid-based copolymer in controlled amounts is used as a surface crosslinking agent for a base polymer powder during preparation of a superabsorbent polymer, a penetration depth of the surface crosslinking agent into the base polymer powder and a degree of surface crosslinking reaction may be uniformly controlled, and as a result, a surface-crosslinked layer having a uniform thickness and crosslinking density may be formed on the base polymer powder, despite the irregular shape of the base polymer powder. Further, by controlling a neutralization degree of the crosslinked polymer according to its location in the superabsorbent polymer, the superabsorbent polymer of one embodiment may have an improved absorption rate and a greatly reduced content of fine particles while basically maintaining excellent absorption performance and powder characteristics, thereby being effectively used in a variety of sanitary materials, in particular, a sanitary material having a reduced content of pulp, etc. Furthermore, the superabsorbent polymer may have optimized gel strength to have reduced generation of fine particles and reduced surface crosslinking damage, thereby preventing deterioration of physical properties, and it may also exhibit excellent shape sustainability even after absorbing water, thereby exhibiting improved liquid permeability.

Specifically, a superabsorbent polymer according to one embodiment of the present invention may have gel strength of 8500 Pa to 10,500 Pa, as measured using a rheometer after being swollen with a physiological saline solution (0.9 wt % aqueous sodium chloride solution) for 1 hour, the superabsorbent polymer including:

a base polymer powder including a first crosslinked polymer of a water-soluble ethylene-based unsaturated monomer having acidic groups which are at least partially neutralized; and a surface-crosslinked layer which is located on the base polymer powder, and includes a second crosslinked polymer obtained by further crosslinking the first crosslinked polymer via alkylene carbonate, and a polycarboxylic acid-based copolymer, wherein the first crosslinked polymer has a neutralization degree of 70 mol % or less, and the second crosslinked polymer includes acidic groups which are neutralized with potassium salts and has a neutralization degree of more than 70 mol % and less than 100 mol %.

In the superabsorbent polymer of one embodiment, the base polymer powder may include the first crosslinked polymer of the water-soluble ethylene-based unsaturated monomer, in which at least part of acidic groups derived from acrylic acid or salts thereof are neutralized, and may be prepared by a preparation method of embodiments described below, and thus the first crosslinked polymer exhibits a neutralization degree of 70 mol % or less.

The acidic group of the first crosslinked polymer may specifically be a carboxyl group, and at least part of the acidic groups included in the first crosslinked polymer may be neutralized by an alkali metal-containing basic material to exist in the form of an alkali metal salt-type carboxyl group in the first crosslinked polymer.

The alkali metal may be lithium (Li), sodium (Na), etc., and specifically, sodium. The superabsorbent polymer of one embodiment includes potassium having low ionization energy in the second crosslinked polymer which is included in the surface-crosslinked layer, as described below. Because the first crosslinked polymer constituting the base polymer includes sodium, a difference in the degree of ionization of the metals in the base polymer particles and the surface-crosslinked layer may allow the superabsorbent polymer to exhibit a more improved absorption rate, as compared with the case where a single-type metal salt is uniformly distributed throughout the absorbent polymer powder.

Further, the neutralization degree in the first crosslinked polymer may influence the absorption rate and the content of fine particles of the superabsorbent polymer. As the neutralization degree of the first crosslinked polymer increases, the absorption rate of the superabsorbent polymer is increased, whereas the content of fine particles is also increased. Therefore, to achieve a balance between the increase of the absorption rate and the decrease of the content of fine particles which have a trade-off relationship therebetween, it is necessary to control the neutralization degree of the first crosslinked polymer in the base polymer powder. Specifically, when the neutralization degree of the first crosslinked polymer exceeds 70 mol %, the content of fine particles is greatly increased, and the absorption rate is decreased. For this reason, the neutralization degree of the first crosslinked polymer may be 70 mol % or less. More specifically, the neutralization degree of the first crosslinked polymer may be 70 mol % or less and 50 mol % or more or 60 mol % or more. Within this range, the effects of improving the absorption rate and reducing the content of fine particles by controlling the neutralization degree of the first crosslinked polymer may be further enhanced.

Meanwhile, in the present invention, the neutralization degree of the first crosslinked polymer in the base polymer powder may be calculated from the amounts of the water-soluble ethylene-based unsaturated monomer having acidic groups and the basic material used for the preparation of the polymer, for example, the amounts of acrylic acid and sodium hydroxide.

In the superabsorbent polymer of one embodiment, the surface-crosslinked layer includes the second crosslinked polymer which is obtained by further crosslinking the first crosslinked polymer of the base polymer powder via a particular surface crosslinking agent.

The surface crosslinking agent may include potassium hydroxide, alkylene carbonate, and a polycarboxylic acid-based copolymer, as described below, and the surface-crosslinked layer prepared thereby may include the components derived from the surface crosslinking agent, along with the second crosslinked polymer obtained by secondarily crosslinking the first crosslinked polymer of the base polymer powder via the above-described surface crosslinking agent.

Specifically, the second crosslinked polymer is a polymer obtained by secondarily crosslinking the first crosslinked polymer of the base polymer powder via alkylene carbonate of the surface crosslinking agent, and at least part of the acidic groups that are not neutralized in the first crosslinked polymer is additionally neutralized by potassium salts derived from potassium hydroxide in the surface crosslinking agent. Thus, a potassium salt-type acidic group, specifically, a potassium salt-type carboxyl group, may be further included.

Potassium has lower ionization energy than other monovalent alkali metals, and the potassium salt-type carboxyl group including the same has a larger number of absorption sites than other monovalent alkali metal salt-type carboxyl groups, and shows increased interaction with water. As a result, the superabsorbent polymer including the second crosslinked polymer may exhibit more excellent absorption performance and absorption rate.

Further, since the acidic groups in the second crosslinked polymer are additionally neutralized by potassium hydroxide included in the surface crosslinking agent, the second crosslinked polymer has a higher neutralization degree than the first crosslinked polymer, specifically, a neutralization degree of more than 70 mol % and less than 100 mol %. As described, since the second crosslinked polymer has the high neutralization degree, affinity with water and repulsive forces between anions of carboxylic acid salt are increased, and as a result, more excellent effects may be obtained in terms of absorption rate.

In the present invention, the neutralization degree of the second crosslinked polymer in the superabsorbent polymer may be calculated from the neutralization degree of the superabsorbent polymer (RND), the neutralization degree of the first crosslinked polymer (BRND), and a volume ratio of the surface-crosslinked layer according to the following Equation 2.

Neutralization degree of second crosslinked polymer (SND)=(RND−BRND×volume ratio of non-surface-crosslinked layer)/volume ratio of surface-crosslinked layer  [Equation 2]

Methods of measuring the neutralization degree of the superabsorbent polymer (RND), the neutralization degree of the first crosslinked polymer (BRND), and the volume ratio of the surface-crosslinked layer in Equation 2 will be described in detail below.

Further, the surface-crosslinked layer includes alkylene carbonate and a polycarboxylic acid-based copolymer, along with the second crosslinked polymer.

The alkylene carbonate is a compound containing an ethylenically unsaturated functional group which is reactable with a functional group of the first crosslinked polymer, and serves to perform the secondary crosslinking polymerization. Further, when the alkylene carbonate is used together with the polycarboxylic acid-based copolymer, it may be more evenly applied onto the surface of the polymer particles, thereby inducing uniform surface crosslinking, and as a result, liquid permeability and absorbency under pressure of the superabsorbent polymer may be further improved.

As the alkylene carbonate, an alkylene carbonate compound having 3 to 10 carbon atoms may be specifically used. Specific examples thereof may include ethylene carbonate (1,3-dioxolan-2-one), 4-methyl-1,3-dioxolan-2-one, 4,5-dimethyl-1,3-dioxolan-2-one, 4,4-dimethyl-1,3-dioxolan-2-one, 4-ethyl-1,3-dioxolan-2-one, 4-hydroxymethyl-1,3-dioxolan-2-one, 1,3-dioxan-2-one, 4-methyl-1,3-dioxan-2-one, 4,6-dimethyl-1,3-dioxan-2-one, 1,3-dioxepan-2-one, etc., and any one or a mixture of two or more thereof may be used.

Further, the polycarboxylic acid-based copolymer may be a polycarboxylic acid-based copolymer including a repeating unit represented by the following Formula 1a and a repeating unit represented by the following Formula 1b, and the polycarboxylic acid-based copolymer may be included in the second crosslinked polymer by a physical bond (entanglement):

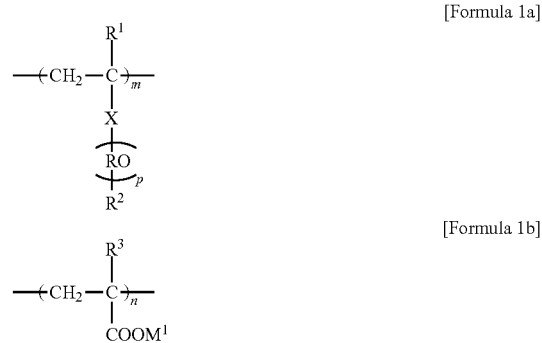

[Formula 1a]

[Formula 1b]

wherein, in Formulae 1a and 1b, $R^1$, $R^2$, and $R^3$ are each independently hydrogen or an alkyl group having 1 to 6 carbon atoms, RO is an oxyalkylene group having 2 to 4 carbon atoms, $M^1$ is hydrogen or a monovalent metal or non-metal ion, X is —COO—, an alkyloxy group having 1 to 5 carbon atoms, or an alkyldioxy group having 1 to 5 carbon atoms, m is an integer of 1 to 100, n is an integer of 1 to 1000, and is an integer of 1 to 150 (when p is 2 or more, two or more repeating —RO— may be the same as or different from each other).

Here, the polycarboxylic acid-based copolymer may include two or more different repeating units represented by Formula 1b.

The polycarboxylic acid-based copolymer having the repeating units represented by Formulae 1a and 1b may allow the alkylene carbonate to be evenly applied onto the surface of the polymer particles, thereby preparing a superabsorbent polymer in which surface crosslinking is more evenly performed. Furthermore, the polycarboxylic acid-based copolymer may exhibit a lubricating effect, which may contribute to improvement of operability of a mixer during the surface crosslinking reaction. Among physical properties of the superabsorbent polymer, permeability generally has a trade-off relationship with centrifuge retention capacity and absorbency under pressure. When the surface crosslinking reaction is performed in the presence of the polycarboxylic acid-based copolymer, it is possible to provide a superabsorbent polymer having improved permeability while having excellent absorption properties such as centrifuge retention capacity and absorbency under pressure. Further, when the surface crosslinking reaction is performed in the presence of the polycarboxylic acid-based copolymer, generation of coarse particles and fine particles is reduced, thereby achieving excellent productivity.

Specifically, as the polycarboxylic acid-based copolymer, random copolymers derived from hydrophilic monomers such as an alkoxy polyalkylene glycol mono(meth)acrylic acid ester-based monomer (representative example: methoxy polyethylene glycol monomethacrylate (MPEG-MAA), etc.) or a (meth)acrylic acid ester-based monomer (representative example: (meth)acrylic acid, etc.) may be advantageous in terms of the above-described effects.

Further, the polycarboxylic acid-based copolymer may have a weight average molecular weight (Mw) of 500 g/mol to 1,000,000 g/mol. When the Mw of the polycarboxylic acid-based copolymer is less than 500 g/mol, it is difficult to exhibit sufficient lubricating effects, and when the Mw of the polycarboxylic acid-based copolymer is more than 1,000,000 g/mol, the uniform surface crosslinking of the surface of the first crosslinked polymer by the surface crosslinking agent may be deteriorated. More specifically, the polycarboxylic acid-based copolymer may have a weight average molecular weight (Mw) of 500 g/mol or more, or 10,000 g/mol or more and 1,000,000 g/mol or less, or 50,000 g/mol or less. When the polycarboxylic acid-based copolymer has a weight average molecular weight within the above range, the effects obtained by adding the polycarboxylic acid-based copolymer may be better achieved.

In the present invention, a molecular weight distribution of the polycarboxylic acid-based copolymer may be obtained by determining the weight average molecular weight (Mw) and the number average molecular weight (Mn) of the polymer by gel permeation chromatography (GPC), and then calculating a ratio (MWD=Mw/Mn) of the weight average molecular weight to the number average molecular weight. In this regard, Mw and Mn are given in terms of the weight of polystyrene. Specifically, a Polymer Laboratories PLgel MIX-B 300-mm column and Waters PL-GPC220 equipment are used for the measurement. At this time, a test temperature is 160° C., 1,2,4-trichlorobenzene is used as a solvent, and a flow rate is 1 mL/min. Further, a sample is prepared at a concentration of 10 mg/10 mL, and provided at a volume of 200 μL. A calibration curve generated with a polystyrene standard is used to induce Mw and Mn values. In this regard, 9 kinds of the polystyrene standards having a molecular weight (g/mol) of 2000/10,000/30,000/70,000/200,000/700,000/2,000,000/4,000,000/10,000,000 are used.

Further, in the superabsorbent polymer according to one embodiment of the present invention, the thickness of the surface-crosslinked layer may be controlled by controlling a content ratio of the components in the above-described surface crosslinking agent. When the respective components are included such that they satisfy the conditions of the following Equation 1, the surface-crosslinked layer may be formed at a thickness corresponding to 7 volume % or more and 20 volume % or less with respect to the total volume of the superabsorbent polymer (when converted to a volume ratio, it corresponds to a volume ratio of 0.07 or more and 0.2 or less, based on the total volume of the superabsorbent polymer). When the thickness of the surface-crosslinked layer is less than 7 volume % with respect to the total volume of the superabsorbent polymer, the improvement effect due to formation of the surface-crosslinked layer may not be sufficient, and when the thickness of the surface-crosslinked layer is more than 20 volume % with respect to the total volume of the superabsorbent polymer, physical properties of the superabsorbent polymer may be deteriorated due to the increased thickness of the surface-crosslinked layer. More specifically, the thickness of the surface-crosslinked layer may be formed at 7 volume % or more, 8 volume % or more, 10 volume % or more, and 18 volume % or less, 17.5 volume % or less, 15 volume % or less, or 13 volume % or less.

By controlling the neutralization degree of the crosslinked polymer according to its location and by controlling formation of the surface-crosslinked layer using the surface crosslinking agent of the optimized combination during the preparation, the above-described superabsorbent polymer may exhibit optimized gel strength and an excellent absorption rate without increasing a specific surface area by chemical foaming or a physical method.

Specifically, the superabsorbent polymer has gel strength of 8500 Pa or more, 9000 Pa or more, 9100 Pa or more, or 9500 or more, and 10,500 Pa or less, 10,000 Pa or less, or 9700 Pa or less, and due to uniform surface crosslinking, it exhibits the high gel strength, as compared with those prepared by the known methods. Since the superabsorbent polymer has such a high gel strength, generation of fine particles due to pulverization and surface crosslinking damage may be reduced to prevent deterioration of physical properties. Although the volume of the superabsorbent polymer increases by absorbing water, it may exhibit excellent shape-sustainability such that it is capable of maintaining its shape, and as a result, the superabsorbent polymer may have improved permeability.

Meanwhile, the gel strength of the superabsorbent polymer may be measured according to a method disclosed in Korean Patent No. 10-1743274. Specifically, the gel strength is a horizontal gel strength value of the superabsorbent polymer which is measured using a rheometer after swelling the superabsorbent polymer with a physiological saline solution (0.9 wt % aqueous sodium chloride solution) for 1 hour. More specifically, a superabsorbent polymer sample (30~50 Mesh) is passed through a sieve, and 1 g thereof is weighed. The weighed sample is sufficiently immersed and swollen in 100 g of the physiological saline solution for 1 hour, and then the solvent not absorbed therein is removed using an aspirator for 4 minutes. The solvent left on the surface of the same is evenly distributed and wiped once with a filter paper. 2.5 g of the swollen superabsorbent polymer is loaded between two plates (with a diameter of 25 mm, a lower plate thereof having a wall with a height of 2 mm for preventing the sample from leaking) of the rheometer, and the gap between the two plates is adjusted to 1 mm (at this time, when the sample is hard and thus it is difficult to adjust the gap to 1 mm, the gap between the plates is appropriately adjusted by pressing the plates with a force of about 3 N so that the swollen superabsorbent polymer sample is contacted evenly at the face of the plates). Subsequently, the superabsorbent polymer sample between the plates is stabilized for about 5 minutes, and a linear viscoelastic regime section of strain where the storage modulus (G') and the loss modulus (G") are steady is found by using the rheometer while increasing the strain at frequency of 10 rad/s. Generally, in the case of a swollen superabsorbent polymer, a strain of 0.1% is imparted in the linear regime section, and viscoelastic properties (G', G") of the swollen polymer are measured by using the strain value of the linear regime section at a constant frequency of 10 rad/s for 60 seconds. The gel strength may be obtained by averaging the obtained G' values.

Further, the superabsorbent polymer may have a bulk density (B/D) of 0.4 g/ml or more or 0.5 g/ml or more, and 0.8 g/ml or less or 0.65 g/ml or less, and an absorption rate (vortex time) of 20 s or more or 30 s or more, and 50 s or less.

In the present invention, the bulk density of the superabsorbent polymer may be determined by placing about 100 g of the superabsorbent polymer in a funnel-type bulk density tester, flowing the superabsorbent polymer into a 100-ml container, measuring the weight of the superabsorbent polymer received in the container, and calculating a weight ratio of the superabsorbent polymer with respect to the volume of the container (100 ml) (the weight of the superabsorbent polymer/the volume of the container) (unit: g/ml).

Further, the absorption rate of the superabsorbent polymer means a time taken for a vortex of a liquid to disappear due to rapid absorption when the superabsorbent polymer added to the physiological saline solution is stirred. In other words, the absorption rate means a vortex removal time. The absorption rate or the vortex removal time of the superabsorbent polymer may be calculated by, for example, a method of adding the superabsorbent polymer to the physiological saline solution (0.9 wt % NaCl solution) while stirring, and then measuring a time taken for a vortex of the liquid generated by stirring to disappear and for the liquid surface to be completely level.

Further, the content of fine particles of 100 mesh or less in the superabsorbent polymer may be 1% by weight or less, or 0.9% by weight or less, or 0.7% by weight or less with respect to the total weight of the superabsorbent polymer. Although the lower content of fine particles is more preferable, fine particles may be included in an amount of 0.1% by weight or more, or 0.3% by weight or more due to limitation of the preparation conditions. As described, the superabsorbent polymer may have the remarkably reduced content of fine particles, as compared with the existing superabsorbent polymers, thereby showing more excellent processability.

Meanwhile, in the present invention, the content of fine particles of 100 mesh or less (150 μm or less) in the superabsorbent polymer may be measured by placing 100 g of the surface-crosslinked superabsorbent polymer in a turbulizer mixer, operating the mixer at 1000 rpm for 1 minute, completely recovering the superabsorbent polymer, and size-sorting the recovered superabsorbent polymer using a sieving shaker under sorting conditions of an amplitude of 1.5 mm/g and a time of 10 min.

Additionally, the superabsorbent polymer may have a neutralization degree (RND) of 52 mol % or more or 60 mol % or more, and less than 76 mol %. When the superabsorbent polymer has the neutralization degree within the above range, it may exhibit more excellent absorbency.

In the present invention, the neutralization degree may be determined by measuring an extractable content by back titration using a pH titrator according to the European Disposables and Nonwovens Association (EDANA) standard test method, WSP 270.3-10, and then calculating the final neutralization degree according to the following method.

Carboxylate nCOOH (moles), $$nCOOH = (VNaOH,s - VNaOH,b) \cdot cNaOH$$

wherein VNaOH,s represents a volume (ml) of NaOH which is required to titer a filtered sample solution to pH 10.0, VNaOH,b represents a volume (ml) of NaOH which is required to titer a blank solution containing no superabsorbent polymer to pH 10.0, and cNaOH represents a concentration (mol/L) of NaOH used in titration.

$$ntot = (VHCl,s - VHCl,b) \cdot cHCl$$

wherein VHCl,s represents a volume (ml) of HCl which is required to titer the filtered sample solution from pH 10.0 to pH 4.0, VHCl,b represents a volume (ml) of HCl which is required to titer the blank solution containing no superabsorbent polymer from pH 10.0 to pH 4.0, and cHCl represents a concentration (mol/L) of HCl used in titration.

The neutralization degree may be determined from nCOONa=ntot−nCOOH, and finally determined from the final neutralization degree (mol %)=nCOONa/ntot×100.

Further, the content of carboxylic acid in the superabsorbent polymer may be determined from the neutralization degree according to the following Equation 3, and specifically, may be 48 mol % or less or 40 mol % or less, and 24 mol % or more or 28 mol % or more.

Content of carboxylic acid in superabsorbent polymer (RCA)=100−RND        [Equation 3]

Further, the superabsorbent polymer may have powder flowability of 9.0 g/s or more, 9.5 g/s or more, or 10 g/s or more, and 11.0 g/s or less or 10.5 g/s or less.

In the present invention, the powder flowability of the superabsorbent polymer may be determined by mixing the superabsorbent polymer well to evenly mix the particles, taking 100±0.5 g of the sample, pouring it into a 250 ml beaker, placing a density measuring cup in the center under the funnel, closing the hole of the funnel, lightly pouring the weighed sample in the funnel, starting a stopwatch at the moment the closed hole of the funnel is opened, and measuring the time taken for the sample to completely reach the bottom of the funnel. At this time, the measurement is performed under the conditions of constant temperature and humidity (temperature of 23±2° C., relative humidity of 45±10%).

Further, the above-described superabsorbent polymer may exhibit excellent absorption performances and centrifuge retention capacity, along with the improved absorption rate. Specifically, the superabsorbent polymer may have absorbency under pressure (AUP) of 20 g/g or more or 22 g/g or more, and 30 g/g or less or 26 g/g or less, as measured according to the EDANA method WSP 242.3. Further, the superabsorbent polymer may have 30 min-centrifuge retention capacity (CRC) of 25 g/g or more or 28 g/g or more, and 36 g/g or less or 32 g/g or less, for a physiological saline solution (0.9 wt % aqueous sodium chloride solution), as measured according to EDANA WSP 241.3.

In this regard, the centrifuge retention capacity (CRC) may be calculated by the following Equation 5, after allowing the superabsorbent polymer to absorb the physiological saline solution over 30 minutes:

CRC (g/g)={[$W_2$ (g)−$W_1$ (g)]/$W_0$ (g)}−1        [Equation 5]

wherein, in Equation 5, $W_0$ (g) is the initial weight (g) of the superabsorbent polymer, $W_1$ (g) is the weight of the apparatus, which is measured after immersing in the physiological saline solution for 30 minutes without the superabsorbent polymer and draining water off at 250 G for 3 minutes using a centrifuge, and $W_2$ (g) is the weight of the apparatus including the superabsorbent polymer, which is measured after immersing the superabsorbent polymer in the physiological saline solution at room temperature (23±2° C.) for 30 minutes and draining water off at 250 G for 3 minutes using a centrifuge.

In the present invention, the absorbency under pressure (AUP) of the superabsorbent polymer may be determined according to the EDANA method WSP 242.3. In detail, a 400 mesh stainless steel net is installed in the bottom of a plastic cylinder having an internal diameter of 60 mm. The superabsorbent polymer (W (g) of about 0.90 g) is uniformly scattered on the steel net at room temperature and humidity of 50%, and a piston which may uniformly provide a load of 4.83 kPa (0.7 psi) is put thereon, in which an external diameter of the piston is slightly smaller than 60 mm, there is no gap between the internal wall of the cylinder and the piston, and the jig-jog of the cylinder is not interrupted. At this time, the weight $W_a$ (g) of the apparatus is measured.

After putting a glass filter having a diameter of 90 mm and a thickness of 5 mm in a Petri dish having a diameter of 150 mm, a physiological saline solution composed of 0.90 wt % sodium chloride is poured until the surface level of the physiological saline solution become equal to the upper surface of the glass filter. A sheet of filter paper having a diameter of 90 mm is put on the glass filter. The measurement apparatus is mounted on the filter paper, thereby having the liquid absorbed under the load for 1 hour. 1 hour later, the weight $W_b$ (g) is measured after lifting the measurement apparatus up. Then, absorbency under pressure (g/g) is calculated from $W_a$ and $W_b$ according to the following Equation 6.

$$\text{AUP (g/g)} = \{W_b - W_a\}/W \qquad \text{[Equation 6]}$$

Further, according to another embodiment of the present invention, provided is a superabsorbent polymer including a base polymer powder including: a first crosslinked polymer of a water-soluble ethylene-based unsaturated monomer having acidic groups which are at least partially neutralized; and a surface-crosslinked layer which is located on the base polymer powder and includes a second crosslinked polymer obtained by further crosslinking the first crosslinked polymer via a surface crosslinking agent, wherein a content of particles having a particle size of 150 μm to 850 μm is 99% by weight or more, AUP (0.7 psi) for a 0.9 wt % physiological saline solution is 22 g/g to 25 g/g, CRC for the 0.9 wt % physiological saline solution is 29 g/g to 33 g/g, and a gel strength is 8500 Pa to 10,500 Pa (as measured using a rheometer after swelling the superabsorbent polymer with the physiological saline solution (0.9 wt % aqueous sodium chloride solution) for 1 hour).

In this regard, the base polymer powder and the surface-crosslinked layer in the superabsorbent polymer are the same as described above, and AUP, CRC, and gel strength may be measured by the methods as described above.

Meanwhile, according to still another embodiment of the present invention, a method of preparing the above-described superabsorbent polymer is provided.

Specifically, the superabsorbent polymer may be prepared by a preparation method including the steps of: performing crosslinking polymerization of a water-soluble ethylene-based unsaturated monomer having acidic groups which are at least partially neutralized, in the presence of an internal crosslinking agent, and then neutralizing the product with a basic material to form a water-containing gel polymer including a first crosslinked polymer having a neutralization degree of 70 mol % or less; drying, pulverizing, and size-sorting the water-containing gel polymer to form a base polymer powder; and reacting the base polymer powder with a surface crosslinking solution which is prepared by dissolving a surface crosslinking agent containing potassium hydroxide, alkylene carbonate, and a polycarboxylic acid-based copolymer in water to form a surface-crosslinked layer including a second crosslinked polymer which is obtained by further crosslinking the first crosslinked polymer on the surface of the base polymer powder via alkylene carbonate, wherein the water is used in an amount of 2.5 parts by weight to 10 parts by weight, with respect to 100 parts by weight of the base polymer powder, and the potassium hydroxide, the alkylene carbonate, and the polycarboxylic acid-based copolymer are used in amounts satisfying the conditions of the following Equation 1:

$$0.05 < a/((b \times d) - c) \leq 1 \qquad \text{[Equation 1]}$$

wherein, in Equation 1, a is the number of moles of alkylene carbonate to be used, b is the number of moles of the acidic group present in the first crosslinked polymer, c is the number of moles of potassium hydroxide (KOH) to be used, and d is a volume ratio of the surface-crosslinked layer with respect to the total volume of the superabsorbent polymer, provided that a and c satisfy the condition of $1 < a/c < 20$.

Hereinafter, each step of an exemplary method of preparing the superabsorbent polymer will be described in detail.

In the preparation method according to one embodiment, the water-containing gel polymer including the first crosslinked polymer having the neutralization degree of 70 mol % or less may be first formed by performing crosslinking polymerization of the water-soluble ethylene-based unsaturated monomer having acidic groups which are at least partially neutralized, in the presence of an internal crosslinking agent.

The water-soluble ethylene-based unsaturated monomer having acidic groups which are at least partially neutralized may be prepared by neutralizing the water-soluble ethylene-based unsaturated monomer having acidic groups with a basic material.

Specifically, the water-soluble ethylene-based unsaturated monomer having acidic groups may include anionic monomers such as acrylic acid, methacrylic acid, maleic anhydride, fumaric acid, crotonic acid, itaconic acid, 2-acryloyl ethane sulfonic acid, 2-methacryloyl ethane sulfonic acid, 2-(meth)acryloyl propane sulfonic acid, or 2-(meth)acrylamido-2-methyl propane sulfonic acid, and salts thereof; nonionic, hydrophilic monomers such as (meth)acrylamide, N-substituted (meth)acrylate, 2-hydroxyethyl(meth)acrylate, 2-hydroxypropyl(meth)acrylate, methoxypolyethylene glycol(meth)acrylate, or polyethylene glycol (meth)acrylate; and amino group-containing unsaturated monomers such as (N,N)-dimethylaminoethyl(meth)acrylate or (N,N)-dimethylaminopropyl(meth)acrylamide, quaternary products thereof, etc., and any one or a mixture of two or more thereof may be used. Among them, acrylic acid or a salt thereof, for example, acrylic acid at least partially neutralized and/or an alkali metal salt such as a sodium salt thereof may be used, and the use of these monomers enables preparation of a superabsorbent polymer having more excellent physical properties.

As the basic material for neutralization of the acidic groups in the water-soluble ethylene-based unsaturated monomer, alkali metal-containing compounds may be used. More specifically, the basic material may include: hydroxides of alkali metals, such as lithium hydroxide, sodium hydroxide, and potassium hydroxide, or hydrates thereof; and alkali metal salts such as sodium carbonate, sodium bicarbonate, sodium phosphate, etc., and any one or a mixture of two or more thereof may be used. The basic material may be used in an amount such that the neutralization degree of the first crosslinked polymer becomes 70 mol % or less, more specifically, 70 mol % or less, and 50 mol % or more or 60 mol % or more, as described above.

Through the neutralization reaction, at least part of the acidic groups in the water-soluble ethylene-based unsaturated monomer may include acidic groups bound with the alkali metal salt derived from the basic material.

Meanwhile, as the internal crosslinking agent for introducing the basic crosslinking structure into the base polymer powder, any internal crosslinking agent having a crosslinkable functional group which is generally used for the preparation of superabsorbent polymers may be used without particular limitation. However, in order to further improve the physical properties of the superabsorbent polymer by introducing an appropriate crosslinking structure into the base polymer powder, more specifically, in order to appropriately achieve the above-described physical properties of the base polymer powder and to obtain improved liquid permeability and anti-caking properties of the superabsorbent polymer, one or more selected from the group consisting of bis(meth)acrylamide having 8 to 30 carbon atoms, poly(meth)acrylate of polyol having 2 to 30 carbon atoms, and poly(meth)allyl ether of polyol having 2 to 30 carbon atoms may be used as the internal crosslinking agent.

More specific examples of the internal crosslinking agent may include polyethylene glycol diacrylate (PEGDA), glycerin diacrylate, glycerin triacrylate, unmodified or ethoxylated trimethylolpropane triacrylate (ethoxylated-TMPTA), hexanediol diacrylate, triethylene glycol diacrylate, etc., and any one or a mixture of two or more thereof may be used.

The internal crosslinking agent may be included at a concentration of 0.01% by weight to 0.5% by weight with respect to the total weight of the monomer, thereby crosslinking the polymerized polymer.

In addition, a polymerization initiator that is generally used in the preparation of superabsorbent polymers may be further introduced during the internal crosslinking.

Specifically, the polymerization initiator may include a thermal polymerization initiator or a photo-polymerization initiator by UV irradiation, depending on the polymerization method. However, even in the case of using the photo-polymerization method, a certain amount of heat is generated by the ultraviolet irradiation or the like, and a certain degree of heat is generated according to the progress of the exothermic polymerization reaction, and therefore, a thermal polymerization initiator may be additionally used.

The photo-polymerization initiator may be used without particular limitation, as long as it is a compound capable of forming a radical by light such as ultraviolet rays. Specific examples of the photo-polymerization initiator may include benzoin ether, dialkyl acetophenone, hydroxyl alkylketone, phenyl glyoxylate, benzyl dimethyl ketal, acyl phosphine, α-aminoketone, etc., and any one or a mixture of two or more thereof may be used. Meanwhile, specific examples of the acyl phosphine may include commercially available Lucirin TPO, i.e., 2,4,6-trimethylbenzoyl-trimethyl phosphine oxide, or IRGACURE 819, i.e., bis(2,4,6-trimethylbenzoyl)-phenyl phosphine oxide.

More various photo-polymerization initiators are well disclosed in "UV Coatings: Basics, Recent Developments and New Application (Elsevier, 2007)" written by Reinhold Schwalm, p 115, however, the photo-polymerization initiator is not limited to the above-described examples.

The photo-polymerization initiator may be included at a concentration of 0.01% by weight to 1.0% by weight with respect to the total weight of the monomer. When the concentration of the photo-polymerization initiator is excessively low, the polymerization rate may become slow, and when the concentration of the photo-polymerization initiator is excessively high, the molecular weight of the superabsorbent polymer may become small and its physical properties may become uneven.

Further, as the thermal polymerization initiator, one or more selected from the group consisting of persulfate-based initiators, azo-based initiators, hydrogen peroxide, and ascorbic acid may be used. Specifically, examples of the persulfate-based initiators may include sodium persulfate ($Na_2S_2O_8$), potassium persulfate ($K_2S_2O_8$), ammonium persulfate (($NH_4$)$_2S_2O_8$), etc., and examples of the azo-based initiators may include 2,2-azobis(2-amidinopropane)dihydrochloride, 2,2-azobis-(N,N-dimethylene)isobutyramidine dihydrochloride, 2-(carbamoylazo)isobutyronitrile, 2,2-azobis[2-(2-imidazolin-2-yl)propane]dihydrochloride, 4,4-azobis-(4-cyanovaleric acid), etc.

More various thermal polymerization initiators are well disclosed in 'Principles of Polymerization (Wiley, 1981)' written by Odian, p 203, however, the thermal polymerization initiator is not limited to the above-described examples.

The thermal polymerization initiator may be included at a concentration of 0.001% by weight to 0.5% by weight with respect to the total weight of the monomer. When the concentration of the thermal polymerization initiator is excessively low, the additional thermal polymerization hardly occurs and thus effects due to the addition of the thermal polymerization initiator may be insignificant, and when the concentration of the thermal polymerization initiator is excessively high, the molecular weight of the superabsorbent polymer becomes small and the physical properties may become uneven.

In addition, additives such as a foaming agent, a thickener, a plasticizer, a preservation stabilizer, an antioxidant, a surfactant, etc. may be further introduced during the crosslinking polymerization, as needed. As the additives, various additives that are widely used in the field of the superabsorbent polymer may be used without limitation.

For example, the superabsorbent polymer according to one embodiment of the present invention may exhibit an excellent effect of improving the absorption rate even without increasing the specific surface area by a foaming agent. However, when a foaming agent is optionally used during polymerization of the water-containing gel polymer for the preparation of the base polymer, the effect of improving the absorption rate may be further enhanced. The foaming agent may include foaming agents that are commonly used. Specifically, carbonate-based foaming agents such as sodium bicarbonate ($NaHCO_3$), sodium carbonate ($Na_2CO_3$), etc. may be used.

Further, the foaming agent may be included at a concentration of 0.001% by weight to 0.5% by weight with respect to the total weight of the monomer. When the foaming agent is included within the above range, the specific surface area of the superabsorbent polymer may be increased to further improve the absorption rate.

Meanwhile, the raw materials such as the water-soluble ethylene-based unsaturated monomer, the photo-polymerization initiator, the thermal polymerization initiator, the internal crosslinking agent, and the additives may be prepared in the form of being dissolved in a solvent.

In this regard, any solvent may be used without particular limitation, as long as it is able to dissolve the above-mentioned components. Specifically, the solvent may include water, ethanol, ethylene glycol, diethylene glycol, triethylene glycol, 1,4-butanediol, propylene glycol, ethylene glycol monobutylether, propylene glycol monomethylether, propylene glycol monomethyl ether acetate, methylethylketone, acetone, methylamylketone, cyclohexanone, cyclopentanone, diethylene glycol monomethylether, diethylene glycol ethylether, toluene, xylene, butylolactone, carbitol, methylcellosolve acetate, N,N-dimethyl acetamide, etc., and any one or a mixture of two or more thereof may be used.

The solvent may be included in a residual amount excluding the above-described components from the total weight of the monomer mixture.

Meanwhile, the method of forming the water-containing gel polymer by the thermal polymerization or photopolymerization of such a monomer composition is not particularly limited by its constitution, as long as it is a polymerization method that is commonly used.

For example, the method of polymerizing the monomer composition may be largely classified into thermal polymerization and photo-polymerization depending on a polymerization energy source. The thermal polymerization may be commonly carried out in a reactor like a kneader equipped with agitating spindles in order to facilitate bubble generation. In contrast, the photo-polymerization may be carried out in a reactor equipped with a movable conveyor belt. However, the above-described polymerization methods are only exemplary, and the present invention is not limited thereto.

Further, a polymerization temperature of the monomer mixture may be controlled from about 40° C. to 90° C., thereby effectively inducing vaporization of the volatile organic solvent and polymerization of the water-containing gel polymer in which pores are formed.

In this regard, a means for achieving the polymerization temperature within the above-described range is not particularly limited. Heating may be performed by providing a heating medium or by directly providing a heat source. The kind of the heating medium applicable may be steam, hot air, a heated fluid such as hot oil, etc., but is not limited thereto. Further, the temperature of the heating medium provided may be appropriately selected by considering the means of the heating medium, the heating speed, and the target temperature of heating. Meanwhile, a heating method using electricity or a heating method using gas may be used when the heat source is provided directly, but the heat source is not limited to these examples.

Further, a polymerization time of the monomer mixture may be controlled from 30 seconds to 10 minutes, thereby forming a water-containing gel polymer having an optimized pore structure.

For example, the water-containing gel polymer obtained according to the thermal polymerization that is carried out in the reactor like a kneader equipped with agitating spindles by providing hot air thereto or by heating the reactor may have a particle size of several centimeters to several millimeters when it is discharged from the outlet of the reactor, according to the shape of the agitating spindle equipped in the reactor. Specifically, the size of the obtained water-containing gel polymer may vary depending on the concentration of the monomer composition injected thereto, the injection speed, or the like, and generally, a water-containing gel polymer having a weight average particle size of about 2 mm to about 50 mm may be obtained.

Further, as described above, when the photo-polymerization is carried out in a reactor equipped with a movable conveyor belt, the obtained water-containing gel polymer may usually be a sheet-like water-containing gel polymer having a width of the belt. In this case, the thickness of the polymer sheet may vary depending on the concentration of the monomer composition injected thereto and the injection speed. Usually, it is preferable to supply the monomer mixture so that a sheet-like polymer having a thickness of about 0.5 cm to about 5 cm may be obtained. When the monomer composition is supplied to such an extent that the thickness of the sheet-like polymer becomes too thin, it is undesirable because the production efficiency is low, and when the thickness of the sheet-like polymer is more than 5 cm, the polymerization reaction may not be evenly carried out over the entire thickness because of the excessive thickness.

The water-containing gel polymer obtained by the above-mentioned method may have a water content of 40% by weight to % by weight. The "water content" as used herein means a weight occupied by water with respect to the total weight of the water-containing gel polymer, which may be a value obtained by subtracting the weight of the dried polymer from the weight of the water-containing gel polymer. Specifically, the water content may be defined as a value calculated by measuring the weight loss due to evaporation of moisture in the polymer during the process of drying by raising the temperature of the polymer through infrared heating. At this time, the water content is measured under the drying conditions determined as follows: the drying temperature is increased from room temperature to about 180° C. and then the temperature is maintained at 180° C., and the total drying time is set to 20 minutes, including 5 minutes for the temperature rising step.

After the monomers are subjected to crosslinking polymerization, the base polymer powder may be obtained through processes of drying, pulverizing, size-sorting, etc.

Through the processes such as pulverizing, size-sorting, etc., the base polymer powder having a particle diameter of 150 μm to 850 μm is suitably produced and provided. More specifically, at least 99% by weight or more of the base polymer powder has a particle diameter of 150 μm to 850 μm and fine particles having a particle diameter of 100 mesh or less, i.e., less than 150 μm, may be included in an amount of 1% by weight or less.

As described above, as the particle size distribution of the base polymer powder and the superabsorbent polymer is adjusted within the preferable range, the superabsorbent polymer finally prepared may exhibit more satisfactory physical properties mentioned above.

On the other hand, the methods of drying, pulverizing, and size-sorting will be described in more detail below.

First, when drying the water-containing gel polymer, a coarsely pulverizing step may be further carried out before drying, in order to increase the efficiency of the drying step, if necessary.

A pulverizer used here is not limited by its configuration, and specifically, it may include any one selected from the group consisting of a vertical pulverizer, a turbo cutter, a turbo grinder, a rotary cutter mill, a cutter mill, a disc mill, a shred crusher, a crusher, a chopper, and a disc cutter, but is not limited to the above-described examples.

In this regard, the coarsely pulverizing step may be carried out so that the particle diameter of the water-containing gel polymer becomes about 2 mm to about 10 mm. Pulverizing of the water-containing gel polymer into a particle diameter of less than 2 mm is technically not easy due to its high water content, and an agglomeration phenomenon between the pulverized particles may occur. Meanwhile, if the polymer is pulverized into a particle diameter of greater than 10 mm, the effect of increasing the efficiency in the subsequent drying step may be insignificant.

The water-containing gel polymer coarsely pulverized as above or the water-containing gel polymer immediately after polymerization without the coarsely pulverizing step is subjected to a drying step. In this case, the drying temperature of the drying step may be 50° C. to 250° C. When the drying temperature is less than 50° C., the drying time may become too long and the physical properties of the superabsorbent polymer finally formed may be deteriorated, and when the drying temperature is higher than 250° C., only the surface of the polymer is excessively dried, and thus fine particles may be generated during the subsequent pulverizing step, and the physical properties of the superabsorbent polymer finally formed may be deteriorated. More preferably, the drying may be carried out at a temperature of 150° C. or 160° C. or more, and 200° C. or less or 190° C. or less.

The drying time may be 20 minutes to 15 hours, by considering the process efficiency, etc., but it is not limited thereto.

In the drying step, the drying method may also be selected and used without being limited by its constitution, as long as it is a method generally used for drying the water-containing gel polymer. Specifically, the drying step may be carried out by a method such as hot air supply, infrared irradiation, microwave irradiation, ultraviolet irradiation, etc. After the drying step as above is carried out, the water content of the polymer may be 0.05% by weight to 10% by weight.

Subsequently, the dried polymer obtained through the drying step is subjected to a pulverizing step.

The polymer powder obtained through the pulverizing step may have a particle diameter of 150 μm to 850 μm. Specific examples of a pulverizer that may be used to achieve the above particle diameter may include a ball mill, a pin mill, a hammer mill, a screw mill, a roll mill, a disc mill, a jog mill, etc., but is not limited thereto.

Also, in order to manage the physical properties of the superabsorbent polymer powder finally commercialized after the pulverizing step, the polymer powder obtained after the pulverization may undergo a separate step of size-sorting the polymer depending on the particle diameter. Preferably, a polymer having a particle diameter of 150 μm to 850 μm is sorted, and only the polymer powder having such a particle diameter is subjected to the surface crosslinking reaction and finally commercialized.

Next, the method of preparing the superabsorbent polymer of one embodiment may include the step of forming the surface-crosslinked layer by increasing the crosslinking density of the surface of the base polymer powder and the neutralization degree using the surface crosslinking agent after the process of forming the above-described base polymer powder.

The surface crosslinking agent for surface crosslinking may include the above-described potassium hydroxide, alkylene carbonate, and polycarboxylic acid-based copolymer, and the contents thereof satisfy the following Equation 1:

$$0.05 < a/((b \times d) - c) \leq 1 \quad \text{[Equation 1]}$$

wherein, in Equation 1, a is the number of moles of alkylene carbonate to be used, b is the number of moles of the acidic group, specifically, the carboxyl group present in the first crosslinked polymer, c is the number of moles of potassium hydroxide (KOH) to be used, and d is a volume ratio of the surface-crosslinked layer with respect to the total volume of the superabsorbent polymer,
provided that a and c satisfy the condition of $1 < a/c < 20$.

Formation of the surface-crosslinked layer in the superabsorbent polymer influences the absorbency and absorption rate of the polymer and the content of fine particles. Further, potassium hydroxide used in the present invention is to replace the existing Na or exists independently, and part thereof reacts with acrylic acid to form acrylic acid salts. The acrylic acid salts formed at this time have relatively low ionization energy, and thus, after absorption of a solution, a repulsive force between anions is rapidly generated, thereby affecting the absorption rate of the superabsorbent polymer. The surface crosslinking degree may vary depending on the amount of acrylic acid salts, which affects generation of fine particles. In addition, as the amount of potassium hydroxide is increased, the content of carboxylic acid which may cause the surface crosslinking reaction is decreased, and thus a ratio of the amounts of alkylene carbonate and potassium hydroxide affects the absorption rate.

Accordingly, in the present invention, a correlation between the contents of the components of the surface crosslinking agent, i.e., alkylene carbonate and potassium hydroxide, which affect the surface crosslinking and the formation of acrylic acid salts during formation of the surface-crosslinked layer, is optimized as in Equation 1, thereby improving the absorption rate and reducing the content of fine particles while maintaining excellent absorbency of the superabsorbent polymer. If the correlation between the contents of the components used in the preparation of the surface crosslinking agent does not satisfy the conditions of Equation 1, the surface crosslinking by the surface crosslinking agent and the formation of new acrylic acid salts by potassium hydroxide are unbalanced, and thus it is difficult to achieve the effects of improving the absorption rate and reducing the content of fine particles.

More specifically, $a/((b \times d) - c)$ in Equation 1 may be 0.1 or more or 0.2 or more, and 0.5 or less or 0.4 or less. When satisfying the more specified conditions, it is possible to achieve the effects of improving the absorption rate and reducing the content of fine particles while maintaining the excellent absorption performance.

Further, the amounts (a and c) of alkylene carbonate and potassium hydroxide used in the preparation of the superabsorbent polymer are required to satisfy the conditions of $1 < a/c < 20$ as well as the conditions of Equation 1. If a/c is 1 or less, i.e., if the number of moles (c) of potassium hydroxide is equivalent to or higher than the number of moles (a) of alkylene carbonate (i.e., $a \leq c$), the surface crosslinking reaction may be reduced due to the use of excess potassium hydroxide. If a/c is 20 or more, the formation of acrylic acid salts by potassium hydroxide may be reduced due to the use of excess alkylene carbonate, and thus the absorption rate may be reduced. More specifically, a/c may be 2 or more or 2.5 or more, and 18 or less, 16 or less, 10 or less, or 5 or less.

Further, in Equation 1, when the thickness of the surface-crosslinked layer in the finally prepared superabsorbent polymer corresponds to 7 volume % to 20 volume % (0.07 to 0.2, when converted to a volume ratio) with respect to the total volume of the superabsorbent polymer, more specifically, when the thickness is 5 μm to 15 μm, the superabsorbent polymer may achieve excellent effects.

If the content of the polycarboxylic acid-based copolymer in the surface crosslinking agent is too low, the effects required in the present invention may not be sufficiently achieved. On the contrary, if the polycarboxylic acid-based copolymer is excessively used, intrinsic functions of the superabsorbent polymer may be deteriorated, and thus absorption properties may be deteriorated, or surface tension and powder flowability may be reduced, undesirably. Accordingly, under conditions satisfying Equation 1, when the polycarboxylic acid-based copolymer is included in an amount of 0.01 parts by weight to 5 parts by weight, specifically, 0.01 parts by weight or more, or 0.05 parts by weight or more and 0.5 parts by weight or less, or 0.1 parts by weight or less with respect to 100 parts by weight of the base polymer powder, the absorption rate of the superabsorbent polymer may be further improved.

If the content of the alkylene carbonate is too low, the surface crosslinking may not properly occur, and thus physical properties of the final polymer may be deteriorated or the effects required in the present invention may not be sufficiently achieved. On the contrary, if the content of the alkylene carbonate is too high, the absorption performance of the polymer may be deteriorated due to excessive surface crosslinking reaction. Accordingly, under conditions satisfying Equation 1, when the alkylene carbonate is included in an amount of 0.2 parts by weight or more, 0.5 parts by weight or more, or 1 part by weight or more, and 5 parts by weight or less, 3 parts by weight or less, or 2 parts by weight or less with respect to 100 parts by weight of the base polymer powder, the absorption rate of the superabsorbent polymer may be improved, and generation of fine particles may be reduced.

If the content of the potassium hydroxide is too low, the ionization energy may not be reduced, and the neutralization degree may be low, and thus the effects required in the present invention may not be sufficiently achieved. On the contrary, if the content of the potassium hydroxide is too high, the surface crosslinking may not properly occur, and thus the absorbency under pressure and the absorption rate may be reduced. Accordingly, under conditions satisfying Equation 1, when the potassium hydroxide is included in an amount of 0.01 parts by weight or more or 0.1 parts by weight or more, and 2 parts by weight or less or 1 part by weight or less with respect to 100 parts by weight of the base polymer powder, the absorption rate of the superabsorbent polymer may be improved, and generation of fine particles may be reduced.

Meanwhile, to perform the surface crosslinking reaction, a method of feeding the surface crosslinking solution and the pulverized polymer to a reactor and mixing them, a method of spraying the surface crosslinking solution onto the pulverized polymer, or a method of mixing the pulverized polymer and the surface crosslinking solution while continuously feeding them to a mixer being continuously operated may be used.

Accordingly, the surface crosslinking agent may be provided in the form of a surface crosslinking solution after being dissolved in a solvent. Such surface crosslinking solution may be added with water as the solvent.

When the surface crosslinking agent is added with water, the surface crosslinking agent may be evenly dispersed, agglomeration of the polymer particles may be prevented, and the penetrating depth of the surface crosslinking agent into the polymer particles may be optimized. Considering these purposes and effects, the amount of water added may be 2.5 parts by weight or more, 3 parts by weight or more, or 4 parts by weight or more, and 10 parts by weight or less or 7 parts by weight or less, with respect to 100 parts by weight of the base polymer powder. If the water content is less than 2.5 parts by weight, the absorption rate and the absorbency under pressure of the superabsorbent polymer may be reduced, and generation of fine particles may be increased, and if the water content is more than 10 parts by weight, the centrifuge retention capacity may be reduced.

In addition to water, the surface crosslinking solution may further include one or more solvents selected from the group consisting of ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethyl ether, toluene, xylene, butyrolactone, carbitol, methyl cellosolve acetate, and N,N-dimethylacetamide.

Moreover, in the surface crosslinking step, the surface crosslinking agent may further include a thickener. If the surface of the base polymer powder is further crosslinked in the presence of the thickener as described above, it is possible to minimize deterioration of physical properties even after the pulverization.

More specifically, as the thickener, one or more selected from polysaccharides and hydroxy-containing polymers may be used.

Among them, the polysaccharide may be a gum-type thickener, a cellulose type-thickener, etc. Specific examples of the gum-type thickener may include xanthan gum, arabic gum, karaya gum, tragacanth gum, ghatti gum, guar gum, locust bean gum, psyllium seed gum, etc. Specific examples of the cellulose-type thickener may include hydroxypropyl methyl cellulose, carboxymethyl cellulose, methyl cellulose, hydroxymethyl cellulose, hydroxyethyl cellulose, hydroxypropyl cellulose, hydroxyethylmethyl cellulose, hydroxymethylpropyl cellulose, hydroxyethylhydroxypropyl cellulose, ethylhydroxyethyl cellulose, methylhydroxypropyl cellulose, etc. Meanwhile, specific examples of the hydroxy-containing polymer may include polyethylene glycol, polyvinyl alcohol, etc.

The surface crosslinking agent may further include a thermal initiator such as $Na_2S_2O_5$ so that the surface crosslinking reaction may occur more smoothly, depending on the kind of the surface crosslinking agent, and may further include a commercially available discoloration inhibitor.

The surface crosslinking reaction step may be performed at a temperature of 100° C. to 250° C., and may be continuously performed after the drying and pulverizing steps which are performed at a relatively high temperature. In this regard, the surface crosslinking reaction may be performed for 1 min or more or 10 min or more, and 120 min or less, 100 min or less, or 60 min or less. That is, in order to prevent deterioration in physical properties due to damage of the polymer particles by excessive reaction while inducing the minimal surface crosslinking reaction, the surface crosslinking reaction may be performed under the above-described conditions.

Meanwhile, the heating means for the surface crosslinking reaction is not particularly limited. The heating may be carried out by providing a heating medium or by directly providing a heating source. The type of the heat medium that may be used here may include steam, hot air, a heated fluid such as hot oil, etc., but it is not limited thereto. Further, the temperature of the heating medium to be provided may be appropriately selected considering the means of the heating medium, the heating speed, and the target temperature of heating. A heat source to be directly provided may include a heating method using electricity, a heating method using gas, etc., but is not limited to the above-described examples.

By controlling the surface crosslinking reaction using the above-described surface crosslinking agent, it is possible to form the surface-crosslinked layer having the uniform thickness and crosslinking density, despite the irregular particle shape of the base polymer powder. As a result, it is possible to prepare the superabsorbent polymer having the improved absorption rate while having excellent absorption properties such as centrifuge retention capacity and absorbency under pressure without increasing the specific surface area. When the above preparation method is used, the content of fine particles in the superabsorbent polymer may be greatly reduced.

Advantageous Effects

As described above, according to the present invention, it is possible to provide the superabsorbent polymer having the excellent absorption rate without increasing the specific surface area. Further, the content of fine particles in the superabsorbent polymer may be greatly reduced. Accordingly, the superabsorbent polymer may be effectively used in a variety of sanitary materials, in particular, a sanitary material having a reduced content of pulp, etc.

DETAILED DESCRIPTION OF THE EMBODIMENTS

Hereinafter, preferred examples are provided for better understanding of the present invention. However, the following examples are for illustrative purposes only, and the present invention is not intended to be limited by these examples.

<Preparation of Base Polymer Powder>

Preparation Example 1

400 g of acrylic acid was added to a 2 L glass beaker, to which 719.5 g of a 24.3% aqueous sodium hydroxide solution was slowly poured and mixed to prepare a first solution. At this time, neutralization heat was generated, and the mixed solution was stirred at room temperature and cooled to about 41° C.

Subsequently, a second solution prepared by adding 0.200 g of polyethylene glycol diacrylate (PEGDA 600), 0.02 g of 1,6-hexanediol diacrylate, and 0.045 g of dioctyl sulfosuccinate sodium salt (AOT) to 50 g of acrylic acid; 35 g of a 0.31% aqueous ascorbic acid solution (a third solution); and a solution prepared by diluting 1 g of hydrogen peroxide and 0.69 g of potassium persulfate in 40 g of distilled water (a fourth solution) were sequentially added to the first solution, and mixed with each other by stirring.

When the mixed solution stirred in the beaker was gelled and stirring was stopped, the gel was immediately poured in a vat-type tray (15 cm in width×15 cm in length). The poured gel was foamed at about 20 seconds, polymerized, and slowly shrunk. The sufficiently shrunk polymer was torn into 5 to 10 pieces and transferred into a kneader. The lid was closed and kneading was carried out for 5 minutes. In the kneading process, the lid was opened at the passage of 4 minutes from the beginning, 50 g of a 3.5% aqueous potassium persulfate solution was sprayed onto the polymer inside the kneader, and then the lid was closed.

Thereafter, the polymer was passed through a hole having a diameter of 13 mm using a meat chopper to prepare crumbs.

Subsequently, the crumbs were dried in an oven capable of shifting airflow up and down. The crumbs were uniformly dried by flowing hot air at 180° C. from the bottom to the top for 15 minutes and from the top to the bottom for 15 minutes, so that the dried product had a water content of about 2% or less.

Thereafter, the dried crumbs were pulverized using a pulverizer and size-sorted to obtain a base polymer powder having a particle diameter of 150 μm to 850 μm.

Preparation Example 2

400 g of acrylic acid was added to a 2 L glass beaker, to which 616.7 g of a 24.3% aqueous sodium hydroxide solution was slowly poured and mixed to prepare a first solution. At this time, neutralization heat was generated, and the mixed solution was stirred at room temperature and cooled to about 41° C.

Subsequently, a solution prepared by adding 0.200 g of polyethylene glycol diacrylate (PEGDA 600), 0.02 g of 1,6-hexanediol diacrylate, and 0.045 g of dioctyl sulfosuccinate sodium salt (AOT) to 50 g of acrylic acid (a second solution); 35 g of a 0.31% aqueous ascorbic acid solution (a third solution); and a solution prepared by diluting 1 g of hydrogen peroxide and 0.69 g of potassium persulfate in 40 g of distilled water (a fourth solution) were sequentially added to the first solution, and mixed with each other by stirring.

When the solution stirred in the beaker was gelled and stirring was stopped, the gel was immediately poured in a vat-type tray (15 cm in width×15 cm in length). The poured gel was foamed at about 20 seconds, polymerized, and slowly shrunk. The sufficiently shrunk polymer was torn into 5 to 10 pieces and transferred into a kneader. The lid was closed and kneading was carried out for 5 minutes. In the kneading process, the lid was opened at the passage of 4 minutes from the beginning, 50 g of a 3.5% aqueous potassium persulfate solution was sprayed onto the polymer inside the kneader, and then the lid was closed.

Thereafter, the polymer was passed through a hole having a diameter of 13 mm using a meat chopper to prepare crumbs.

Subsequently, the crumbs were dried in an oven capable of shifting airflow up and down. The crumbs were uniformly dried by flowing hot air at 180° C. from the bottom to the top for 15 minutes and from the top to the bottom for 15 minutes, so that the dried product had a water content of about 2% or less.

Thereafter, the dried crumbs were pulverized using a pulverizer and size-sorted to obtain a base polymer powder having a particle diameter of 150 μm to 850 μm.

Preparation Example 3

400 g of acrylic acid was added to a 2 L glass beaker, to which 781.2 g of a 24.3% aqueous sodium hydroxide solution was slowly poured and mixed to prepare a first solution. At this time, neutralization heat was generated, and the mixed solution was stirred at room temperature and cooled to about 41° C.

Subsequently, a second solution prepared by adding 0.200 g of polyethylene glycol diacrylate (PEGDA 600), 0.02 g of 1,6-hexanediol diacrylate, and 0.045 g of dioctyl sulfosuccinate sodium salt (AOT) to 50 g of acrylic acid; 35 g of a 4% aqueous ascorbic acid solution (a third solution); and a solution prepared by diluting 1 g of hydrogen peroxide and 0.69 g of potassium persulfate in 40 g of distilled water (a fourth solution) were sequentially added to the first solution, and mixed with each other by stirring.

When the solution stirred in the beaker was gelled and stirring was stopped, the gel was immediately poured in a vat-type tray (15 cm in width×15 cm in length). The poured gel was foamed at about 20 seconds, polymerized, and slowly shrunk. The sufficiently shrunk polymer was torn into 5 to 10 pieces and transferred into a kneader. The lid was closed and kneading was carried out for 5 minutes. In the kneading process, the lid was opened at the passage of 4 minutes from the beginning, 50 g of a 3.5% aqueous potassium persulfate solution was sprayed onto the polymer inside the kneader, and then the lid was closed.

Thereafter, the polymer was passed through a hole having a diameter of 13 mm using a meat chopper to prepare crumbs.

Subsequently, the crumbs were dried in an oven capable of shifting airflow up and down. The crumbs were uniformly dried by flowing hot air at 180° C. from the bottom to the top for 15 minutes and from the top to the bottom for 15 minutes, so that the dried product had a water content of about 2% or less.

Thereafter, the dried crumbs were pulverized using a pulverizer and size-sorted to obtain a base polymer powder having a particle diameter of 150 μm to 850 μm.

Preparation Example 4

450 g of acrylic acid was added to a 2 L glass beaker, to which 799.5 g of a 24.3% aqueous sodium hydroxide solution was slowly poured and mixed to prepare a first solution. At this time, neutralization heat was generated, and the mixed solution was stirred at room temperature and cooled to about 41° C.

Subsequently, a solution prepared by adding 0.225 g of polyethylene glycol diacrylate (PEGDA 600) and 0.045 g of dioctyl sulfosuccinate sodium salt (AOT) to 50 g of acrylic acid (a second solution); 26 g of a 4% aqueous sodium bicarbonate (NaHCO$_3$) solution (a third solution); 35 g of a 0.31% aqueous ascorbic acid solution (a fourth solution); and a solution prepared by diluting 1 g of hydrogen peroxide and 0.69 g of potassium persulfate in 40 g of distilled water (a fifth solution) were sequentially added to the first solution.

When the solution stirred in the beaker was gelled and stirring was stopped, the gel was immediately poured in a vat-type tray (15 cm in width×15 cm in length). The poured gel was foamed at about 20 seconds, polymerized, and slowly shrunk. The sufficiently shrunk polymer was torn into 5 to 10 pieces and transferred into a kneader. The lid was closed and kneading was carried out for 5 minutes. In the kneading process, the lid was opened at the passage of 4 minutes from the beginning, 50 g of a 3.5% aqueous potassium persulfate solution was sprayed onto the polymer inside the kneader, and then the lid was closed.

Thereafter, the polymer was passed through a hole having a diameter of 13 mm using a meat chopper to prepare crumbs.

Subsequently, the crumbs were dried in an oven capable of shifting airflow up and down. The crumbs were uniformly dried by flowing hot air at 180° C. from the bottom to the top for 15 minutes and from the top to the bottom for 15 minutes, so that the dried product had a water content of about 2% or less.

Thereafter, the dried crumbs were pulverized using a pulverizer and size-sorted to obtain a base polymer powder having a particle diameter of 150 μm to 850 μm.

Preparation Example 5

400 g of acrylic acid was added to a 2 L glass beaker, to which 616.7 g of a 24.3% aqueous sodium hydroxide solution was slowly poured and mixed to prepare a first solution. At this time, neutralization heat was generated, and the mixed solution was stirred at room temperature and cooled to about 41° C.

Subsequently, a solution prepared by adding 0.200 g of polyethylene glycol diacrylate (PEGDA 600), 0.02 g of 1,6-hexanediol diacrylate, and 0.045 g of dioctyl sulfosuccinate sodium salt (AOT) to 50 g of acrylic acid (a second solution); 26 g of a 4% aqueous sodium bicarbonate (NaHCO$_3$) solution (a third solution); 35 g of a 0.31% aqueous ascorbic acid solution (a fourth solution); and a solution prepared by diluting 1 g of hydrogen peroxide and 0.69 g of potassium persulfate in 40 g of distilled water (a fifth solution) were sequentially added to the first solution, and mixed with each other by stirring.

When the solution stirred in the beaker was gelled and stirring was stopped, the gel was immediately poured in a vat-type tray (15 cm in width×15 cm in length). The poured gel was foamed at about 20 seconds, polymerized, and slowly shrunk. The sufficiently shrunk polymer was torn into 5 to 10 pieces and transferred into a kneader. The lid was closed and kneading was carried out for 5 minutes. In the kneading process, the lid was opened at the passage of 4 minutes from the beginning, 50 g of a 3.5% aqueous potassium persulfate solution was sprayed onto the polymer inside the kneader, and then the lid was closed.

Thereafter, the polymer was passed through a hole having a diameter of 13 mm using a meat chopper to prepare crumbs.

Subsequently, the crumbs were dried in an oven capable of shifting airflow up and down. The crumbs were uniformly dried by flowing hot air at 180° C. from the bottom to the top for 15 minutes and from the top to the bottom for 15 minutes, so that the dried product had a water content of about 2% or less.

Thereafter, the dried crumbs were pulverized using a pulverizer and size-sorted to obtain a base polymer powder having a particle diameter of 150 μm to 850 μm.

<Preparation of Polycarboxylic Acid-Based Copolymer>

Preparation Example 6

A polycarboxylic acid-based copolymer was prepared according to a method of Preparation Example 1 disclosed in Korean Patent Publication No. 2015-0143167 (Korean Patent Application No. 2014-0072343).

In detail, 400 parts by weight of ion exchanged water was introduced into a 3 L 4-necked flask reactor equipped with a stirrer, a thermometer, a nitrogen inlet, and a circulating condenser, and the atmosphere inside the reactor was replaced by nitrogen under stirring, followed by heating to 75° C. under the nitrogen atmosphere.

2 parts by weight of ammonium persulfate was introduced into the reactor, and completely dissolved therein. Then, an aqueous monomer solution obtained by mixing 600 parts by weight of methoxypolyethylene glycol monomethacrylate (average addition mole number of ethylene oxide (EO): about 50 moles), 99.6 parts by weight of methacrylic acid, and 190 parts by weight of water, a mixed solution of 5 parts by weight of 3-mercaptopropionic acid and 60 parts by weight of water, and 150 parts by weight of a 3 wt % aqueous ammonium persulfate solution were continuously introduced for 4 hours at a constant speed. After completing the introduction, 5 parts by weight of a 3 wt % aqueous ammonium persulfate solution was further introduced at once.

Thereafter, the internal temperature of the reactor was raised to 85° C., and maintained at 85° C. for 1 hour to complete the polymerization reaction.

A weight average molecular weight of the polycarboxylic acid-based copolymer thus prepared was 40,000 g/mol, as measured by GPC (gel permeation chromatography).

<Preparation of Superabsorbent Polymer>

Example 1

The base polymer powder prepared in Preparation Example 1 was first introduced into a high speed mixer, and a surface crosslinking agent prepared by mixing 4 parts by weight of water, parts by weight of ethanol, 1 part by weight of ethylene carbonate (EC), 0.05 parts by weight of the polycarboxylic acid-based copolymer prepared in Preparation Example 6, 0.2 parts by weight of KOH, and 0.03 parts by weight of a discoloration inhibitor (Blancolen™ HP) with respect to 100 parts by weight of the base polymer powder was introduced into the high speed mixer, followed by stirring at 1000 rpm for 30 seconds. After stirring, a surface crosslinking reaction was performed while stirring the mixture in a planetary mixer at 190° C. for 60 minutes, thereby obtaining a superabsorbent polymer.

Examples 2 to 8 and Comparative Examples 1 to 11

The superabsorbent polymers were obtained in the same manner as in Example 1, except that respective components as described in the following Table 1 were used.

TABLE 1

| | Base polymer | | | Composition of surface crosslinking solution (parts by weight, based on 100 parts by weight of base polymer) | | | | | |
|---|---|---|---|---|---|---|---|---|---|
| | Type | Neutralization degree of first crosslinked polymer* (mol %) | Use of chemical foaming agent** (○/X) | Water | EC | Polycarboxylic acid-based copolymer | KOH | a/c | a/((b × d) − c) |
| Example 1 | Preparation Example 1 | 70 | X | 4 | 1 | 0.05 | 0.2 | 3.186 | 0.337 |
| Example 2 | Preparation Example 1 | 70 | X | 5 | 1.25 | 0.05 | 0.25 | 3.186 | 0.380 |
| Example 3 | Preparation Example 2 | 60 | X | 5 | 1.25 | 0.05 | 0.25 | 3.186 | 0.270 |
| Example 4 | Preparation Example 4 | 70 | ○ | 4 | 1 | 0.05 | 0.2 | 3.186 | 0.337 |
| Example 5 | Preparation Example 5 | 60 | ○ | 5 | 1.25 | 0.05 | 0.25 | 3.186 | 0.270 |
| Example 6 | Preparation Example 2 | 60 | X | 8 | 1.25 | 0.05 | 0.25 | 3.186 | 0.186 |
| Example 7 | Preparation Example 1 | 70 | X | 4 | 1.5 | 0.05 | 0.1 | 9.557 | 0.480 |
| Example 8 | Preparation Example 1 | 70 | X | 4 | 1.25 | 0.05 | 0.05 | 15.928 | 0.445 |
| Comparative Example 1 | Preparation Example 1 | 70 | X | 4 | 1 | 0.05 | — | — | 0.304 |
| Comparative Example 2 | Preparation Example 1 | 70 | X | 2 | 1 | 0.05 | 0.2 | 3.186 | 0.735 |
| Comparative Example 3 | Preparation Example 3 | 76 | X | 4 | 1 | 0.05 | 0.2 | 3.186 | 0.440 |
| Comparative Example 4 | Preparation Example 4 | 70 | ○ | 4 | 1 | 0.05 | — | — | 0.304 |
| Comparative Example 5 | Preparation Example 1 | 70 | X | 4 | 3.5 | 0.05 | 0.2 | 11.150 | 1.178 |
| Comparative Example 6 | Preparation Example 1 | 70 | X | 4 | 1 | 0.05 | 0.02 | 31.856 | 0.307 |
| Comparative Example 7 | Preparation Example 1 | 70 | X | 4 | 1 | — | 0.2 | 3.185 | 0.735 |
| Comparative Example 8*** | Preparation Example 2 | 60 | X | 8 | 0.25 | 0.05 | 0.05 | 3.185 | 0.033 |
| Comparative Example 9 | Preparation Example 1 | 70 | X | 8 | 0.25 | 0.05 | 0.1 | 1.593 | 0.046 |
| Comparative Example 10 | Preparation Example 1 | 70 | X | 4 | 0.3 | 0.05 | 0.2 | 0.956 | 0.138 |
| Comparative Example 11 | Preparation Example 1 | 70 | X | 10.5 | 1 | 0.05 | 0.2 | 3.186 | 0.157 |

*In Table 1, the neutralization degree of the first crosslinked polymer was determined according to (4) a method of measuring the neutralization degree of the first crosslinked polymer described in Experimental Example 1 below.
**In Table 1, the chemical foaming agent was sodium bicarbonate.
***In Table 1, with regard to Comparative Example 8, a base polymer having a low neutralization degree was used during surface crosslinking, and the input of water was increased, instead of reducing the input of KOH, to form a thick surface-crosslinked layer, such that the neutralization degree of the second crosslinked polymer in the prepared superabsorbent polymer was as low as less than 70 mol %.

Experimental Example 1: Analysis of Superabsorbent Polymer

The superabsorbent polymers prepared in the examples and comparative examples were analyzed by the following methods.

(1) Thickness (μm) of Surface-Crosslinked Layer

The thickness was measured according to a method disclosed in "Polymer 145(2018)174~183". The measured value was an average thickness.

(2) Volume Ratios of Surface-Crosslinked Layer and Non-Surface-Crosslinked Layer A volume ratio (d) of the surface-crosslinked layer and a volume ratio of the non-surface-crosslinked layer were calculated, based on the average particle size (425 μm) of the superabsorbent polymer, using the above measured thickness of the surface-crosslinked layer, respectively.

Meanwhile, the average particle size of the superabsorbent polymer was a weight average particle size which was measured according to the European Disposables and Nonwovens Association (EDANA) standard test method, EDANA WSP 220.3.

(3) Neutralization Degree of Superabsorbent Polymer (RND)

The neutralization degree of the superabsorbent polymer was determined by measuring an extractables content by back titration using a pH titrator according to the European Disposables and Nonwovens Association (EDANA) standard test method, WSP 270.3-10, and then calculating a final neutralization degree according to the following method.

Carboxylate nCOOH (moles),

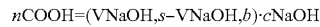

$n\text{COOH} = (V\text{NaOH},s - V\text{NaOH},b) \cdot c\text{NaOH}$ wherein VNaOH,s represents a volume (ml) of NaOH which is required to titer a filtered sample solution to pH 10.0, VNaOH,b represents a volume (ml) of NaOH which is required to titer a blank solution containing no superabsorbent polymer to pH 10.0, and cNaOH represents a concentration (mol/L) of NaOH used in titration.

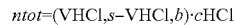

$n\text{tot} = (V\text{HCl},s - V\text{HCl},b) \cdot c\text{HCl}$ wherein VHCl,s represents a volume (ml) of HCl which is required to titer the filtered sample solution from pH 10.0 to pH 4.0, VHCl,b represents a volume (ml) of HCl which is required to titer the blank solution containing no superabsorbent polymer from pH 10.0 to pH 4.0, and cHCl represents a concentration (mol/L) of HCl used in titration.

The neutralization degree was determined from nCOONa=ntot−nCOOH, and finally determined from the equation of the final neutralization degree (mol %)=nCOONa/ntot×100.

(4) Neutralization Degree of First Crosslinked Polymer (BRND) (mol %)

The neutralization degree of the first crosslinked polymer was determined from the amounts of acrylic acid and sodium hydroxide used in the preparation of the polymer.

(5) Neutralization Degree of Second Crosslinked Polymer (SND) (mol %)

The neutralization degree of the second crosslinked polymer was determined from the neutralization degree (RND) of the superabsorbent polymer, the neutralization degree (BRND) of the first crosslinked polymer, and the volume ratio of the surface-crosslinked layer, each previously measured, according to the following Equation 2.

Neutralization degree of second crosslinked polymer (SND)=(RND−BRND×Volume ratio of non-surface-crosslinked layer)/Volume ratio of surface-crosslinked layer [Equation 2]

(6) Content of Carboxylic Acid in Superabsorbent Polymer (RCA) (mol %)

The content of carboxylic acid in the superabsorbent polymer was determined from the above measured neutralization degree (RND) of the superabsorbent polymer according to the following Equation 3.

Content of carboxylic acid in superabsorbent polymer (RCA)=100−RND [Equation 3]

(7) Content of Carboxylic Acid Present in Surface-Crosslinked Layer (SCA) (mol %)

The content of carboxylic acid in the surface-crosslinked layer was determined from the content of carboxylic acid in the first crosslinked polymer (BRCA) (%), the content of carboxylic acid in the superabsorbent polymer (RCA), and the volume ratio of the surface-crosslinked layer according to the following Equation 4.

Content of carboxylic acid present in surface-crosslinked layer (SCA)=(RCA−(100−BRND)×Volume ratio of non-surface-crosslinked layer)/Volume ratio of surface-crosslinked layer [Equation 4]

In Equation 4, the content of carboxylic acid in the first crosslinked polymer (BRCA) (%) is a value of 100-neutralization degree (BRND) of the first crosslinked polymer, RCA, the volume ratio of the non-surface-crosslinked layer which is a volume ratio of a portion excluding the surface-crosslinked layer-formed portion from the superabsorbent polymer (i.e., corresponding to the volume ratio of the 1-surface-crosslinked layer), and the volume ratio of the surface-crosslinked layer are the values obtained according to the above-described methods.

(8) Number of Moles of Carboxylic Acid Present in First Crosslinked Polymer (b)

From the neutralization degree of the first crosslinked polymer, the weight of the acrylic acid in 100 g of the first crosslinked polymer was calculated to determine the number of moles of carboxylic acid.

b=Weight of acrylic acid in 100 g of first crosslinked polymer/molecular weight of acrylic acid

TABLE 2

| | Thickness of surface-crosslinked layer (μm) | Volume ratio of non-surface-crosslinked layer | Volume ratio of surface-crosslinked layer (d) | Neutralization degree of super absorbent polymer (RND) (mol %) | Neutralization degree of first crosslinked polymer (BRND) (mol %) | Neutralization degree of second crosslinked polymer (SND) (mol %) | Content of carboxylic acid in super absorbent polymer (RCA) (mol %) | Content of carboxylic acid in surface-crosslinked layer (SCA) (mol %) | Number of moles of carboxylic acid in first crosslinked polymer (b) |
|---|---|---|---|---|---|---|---|---|---|
| Example 1 | 8 | 0.891 | 0.109 | 71.5 | 70 | 83.79 | 28.5 | 16.21 | 0.3430 |
| Example 2 | 9 | 0.878 | 0.122 | 71.5 | 70 | 82.32 | 28.5 | 17.68 | 0.3430 |
| Example 3 | 9 | 0.878 | 0.122 | 62.4 | 60 | 79.71 | 37.6 | 20.29 | 0.4692 |

TABLE 2-continued

|  | Thickness of surface-crosslinked layer (μm) | Volume ratio of non-surface-crosslinked layer | Volume ratio of surface-crosslinked layer (d) | Neutralization degree of super absorbent polymer (RND) (mol %) | Neutralization degree of first crosslinked polymer (BRND) (mol %) | Neutralization degree of second crosslinked polymer (SND) (mol %) | Content of carboxylic acid in super absorbent polymer (RCA) (mol %) | Content of carboxylic acid in surface-crosslinked layer (SCA) (mol %) | Number of moles of carboxylic acid in first crosslinked polymer (b) |
|---|---|---|---|---|---|---|---|---|---|
| Example 4 | 8 | 0.891 | 0.109 | 71.5 | 70 | 83.79 | 28.5 | 16.21 | 0.3430 |
| Example 5 | 9 | 0.878 | 0.122 | 62.3 | 60 | 78.89 | 37.7 | 21.11 | 0.4692 |
| Example 6 | 13 | 0.827 | 0.173 | 62.4 | 60 | 73.91 | 37.6 | 26.09 | 0.4692 |
| Example 7 | 8 | 0.891 | 0.109 | 70.3 | 70 | 72.76 | 29.7 | 27.24 | 0.3430 |
| Example 8 | 7 | 0.904 | 0.096 | 70.3 | 70 | 73.14 | 29.7 | 26.86 | 0.3430 |
| Comparative Example 1 | 8 | 0.891 | 0.109 | 71.5 | 70 | 83.79 | 28.5 | 16.21 | 0.3430 |
| Comparative Example 2 | 4 | 0.945 | 0.055 | 71.4 | 70 | 95.26 | 28.6 | 4.74 | 0.3430 |
| Comparative Example 3 | 8 | 0.891 | 0.109 | 76.8 | 76 | 83.36 | 23.2 | 16.64 | 0.2703 |
| Comparative Example 4 | 8 | 0.891 | 0.109 | 71.4 | 70 | 82.87 | 28.6 | 17.13 | 0.3430 |
| Comparative Example 5 | 8 | 0.891 | 0.109 | 71.5 | 70 | 83.79 | 28.5 | 16.21 | 0.3430 |
| Comparative Example 6 | 8 | 0.891 | 0.109 | 70.3 | 70 | 72.76 | 29.7 | 27.24 | 0.3430 |
| Comparative Example 7 | 4 | 0.945 | 0.055 | 70.9 | 70 | 86.24 | 29.1 | 13.76 | 0.3430 |
| Comparative Example 8 | 14 | 0.815 | 0.185 | 60.4 | 60 | 62.16 | 39.6 | 37.84 | 0.4692 |
| Comparative Example 9 | 14 | 0.815 | 0.185 | 71.3 | 70 | 77.03 | 28.7 | 22.97 | 0.3430 |
| Comparative Example 10 | 6 | 0.918 | 0.082 | 71.2 | 70 | 84.57 | 28.8 | 15.43 | 0.3430 |
| Comparative Example 11 | 17 | 0.779 | 0.221 | 71.5 | 70 | 76.78 | 28.5 | 23.22 | 0.3430 |

Experimental Example 2: Test of Physical Properties of Superabsorbent Polymer

Physical properties of the superabsorbent polymers prepared in the examples and comparative examples were tested by the following methods, and the results are shown in Table 3.

(1) Gel Strength

A gel strength of the superabsorbent polymers prepared in the examples or comparative examples was measured by a method disclosed in Korean Patent No. 743274.

In detail, the superabsorbent polymer sample (30~50 Mesh) of the examples or comparative examples was passed through a sieve and 0.5 g thereof was weighed. The weighed sample was sufficiently swollen in 50 g of a physiological saline solution for 1 hour. Then, the solvent not absorbed therein was removed using an aspirator for 4 minutes. The solvent left on the surface of the same was evenly distributed and wiped once with a filter paper.

2.5 g of the swollen superabsorbent polymer was loaded between two parallel plates (a diameter of 25 mm, a lower plate thereof having a wall with a height of 2 mm for preventing the sample from leaking) of the rheometer, and the gap between the parallel plates was adjusted to 1 mm. At this time, the gap between the parallel plates was appropriately adjusted by pressing the parallel plates with a force of about 3 N so that the swollen superabsorbent polymer sample was contacted evenly at the face of the parallel plates. A linear viscoelastic regime section of strain where the storage modulus and the loss modulus were steady was found by using the rheometer while increasing the strain at an oscillation frequency of 10 rad/s. Generally, in the case of a swollen superabsorbent polymer sample, a strain of 0.1% is imparted in the linear viscoelastic regime section.

The storage modulus and the loss modulus of the swollen superabsorbent polymer were measured by using the strain value of the linear viscoelastic regime section at a constant oscilation frequency of 10 rad/s for 60 seconds, respectively. The horizontal gel strength was obtained by averaging the obtained storage modulus values. For reference, the loss modulus was measured as a very small value as compared to the storage modulus.

(2) Content of Fine Particles of 100 Mesh or Less After Ball-Mill Pulverization 100 g of the base polymer powder of the examples or Comparative examples was placed in a turbulizer mixer (a mixer customized by UTO engineering), which was then operated at 1000 rpm for 1 minute, and the superabsorbent polymer was completely recovered. The amount (wt %) of fine particles of 100 mesh or less (150 μm or less) in the recovered superabsorbent polymer was measured (based on the total weight of the superabsorbent polymer, wt %) using a sieving shaker (Retsch AS 200 model, amplitude: 1.5 mm/"g", 10-min sieving).

(3) Content of Fine Particles of 100 Mesh or Less After Surface Crosslinking

The amount (wt %) of fine particles of 100 mesh or less (150 μm or less) in the superabsorbent polymer was measured (based on the total weight of the superabsorbent polymer, wt %) in the same manner as the method of measuring the content of fine particles of 100 mesh or less after ball-mill pulverization, except that the surface-crosslinked superabsorbent polymer of the examples or comparative examples was used.

(4) Powder Flowability

The superabsorbent polymer prepared in the examples or comparative examples was mixed well to evenly mix the particles, and then 100.5 g of the sample was taken and poured into a 250 ml beaker. A density measuring cup was placed in the center under the funnel, then the hole of the funnel was closed, and the weighed sample was lightly poured in the funnel. A stopwatch was started at the moment the closed hole of the funnel was opened, and the time taken for the sample to completely reach the bottom of the funnel was measured. All procedures were performed in a constant temperature and humidity room (temperature of 23±2° C., relative humidity of 45±10%).

(5) Bulk Density (B/D)

About 100 g of the superabsorbent polymer prepared in the examples or comparative examples was placed in a funnel-type bulk density tester, and allowed to flow into a 100-ml container, and then the weight of the superabsorbent polymer received in the container was measured. The bulk density was calculated from (the weight of the superabsorbent polymer/the volume of the container, 100 ml) (unit: g/ml).

(6) Absorption Rate (Vortex Time)

The absorption rate of the superabsorbent polymers of the examples and comparative examples was measured in a second unit according to a method described in International Patent Publication No. 1987-003208.

In detail, the absorption rate (vortex time) was determined by adding 2 g of the superabsorbent polymer to 50 mL of a physiological saline solution at 23° C. to 24° C., stirring the solution at 600 rpm with a magnetic bar (diameter of 8 mm, length of 31.8 mm), and measuring the time required for the vortex to disappear in the second unit.

(7) Centrifuge Retention Capacity (CRC)

Centrifuge retention capacity by absorbency under no load was measured for the respective polymers according to EDANA WSP 241.3.

In detail, each of the superabsorbent polymers prepared in the examples and comparative examples was size-sorted through a sieve of #30-50. The initial weight $W_0$ (g) (about 0.2 g) of the size-sorted superabsorbent polymer was uniformly put in a nonwoven fabric-made bag, followed by sealing. Then, the bag was immersed in a physiological saline solution (0.9 wt %) at room temperature. After 30 minutes, water was removed from the bag by centrifugation at 250 G for 3 minutes, and the weight $W_2$ (g) of the bag was then measured. Further, the same procedure was carried out without using the polymer, and then the resultant weight $W_1$ (g) was measured. By using the respective weights thus obtained, CRC (g/g) was calculated according to the following equation.

$$\text{CRC (g/g)} = \{[W_2(g) - W_1(g)]/W_0(g)\} - 1 \quad \text{[Equation 5]}$$

(8) Absorbency Under Pressure (AUP)

The absorbency under pressure (AUP) of the polymers of the examples and comparative examples was measured according to the EDANA method WSP 242.3.

In detail, a 400 mesh stainless steel net was installed in the bottom of a plastic cylinder having an internal diameter of 60 mm. The superabsorbent polymer (W (g) of about 0.90 g) was uniformly scattered on the steel net at room temperature and humidity of 50%, and a piston which may uniformly provide a load of 4.83 kPa (0.7 psi) was put thereon, in which an external diameter of the piston was slightly smaller than 60 mm, there was no gap between the internal wall of the cylinder and the piston, and the jig-jog of the cylinder was not interrupted. At this time, the weight $W_a$ (g) of the apparatus was measured.

After putting a glass filter having a diameter of 90 mm and a thickness of 5 mm in a Petri dish having a diameter of 150 mm, a physiological saline solution composed of 0.90 wt % sodium chloride was poured until the surface level of the physiological saline solution became equal to the upper surface of the glass filter. A sheet of filter paper having a diameter of 90 mm was put on the glass filter. The measurement apparatus was mounted on the filter paper, thereby having the liquid absorbed under the load for 1 hour. 1 hour later, the weight $W_b$ (g) was measured after lifting the measurement apparatus.

Then, absorbency under pressure (g/g) was calculated from $W_a$ and $W_b$ according to the following equation.

$$\text{AUP (g/g)} = \{W_b - W_a\}/W \quad \text{[Equation 6]}$$

TABLE 3

| | Gel strength (Pa) | Content of fine particles of 100 mesh or less after ball-mill pulverizing (% by weight) | Content of fine particles of 100 mesh or less after surface crosslinking (% by weight) | Powder flow ability (g/s) | Bulk density (g/ml) | Absorption rate (sec) | CRC (g/g) | AUP (g/g) |
|---|---|---|---|---|---|---|---|---|
| Example 1 | 9550 | 5.7 | 0.6 | 10.3 | 0.61 | 45 | 30.5 | 24.8 |
| Example 2 | 9530 | 5.6 | 0.7 | 10.3 | 0.61 | 37 | 30.2 | 24.7 |
| Example 3 | 9630 | 5.6 | 0.5 | 10.2 | 0.61 | 50 | 30.2 | 24.8 |
| Example 4 | 9060 | 5.9 | 1 | 10.2 | 0.53 | 31 | 30.5 | 24.0 |
| Example 5 | 9120 | 6.0 | 0.9 | 10.1 | 0.53 | 36 | 30.1 | 24.1 |
| Example 6 | 9680 | 5.4 | 0.4 | 10.4 | 0.61 | 49 | 30.0 | 24.9 |
| Example 7 | 9210 | 5.4 | 0.8 | 10.3 | 0.61 | 51 | 30.2 | 24.8 |
| Example 8 | 9160 | 5.5 | 0.8 | 10.2 | 0.6 | 51 | 30.2 | 24.7 |
| Comparative Example 1 | 8210 | 7.8 | 0.7 | 10.2 | 0.61 | 61 | 30.5 | 24.7 |
| Comparative Example 2 | 8320 | 6.9 | 0.6 | 10.2 | 0.61 | 62 | 30.4 | 24.6 |
| Comparative Example 3 | 8250 | 7.4 | 1.1 | 10.3 | 0.61 | 55 | 30.5 | 24.9 |
| Comparative Example 4 | 8100 | 8.1 | 1.7 | 10.4 | 0.53 | 45 | 30.3 | 24.1 |
| Comparative Example 5 | 8110 | 4.7 | 0.4 | 10.5 | 0.61 | 60 | 27.1 | 21.2 |
| Comparative Example 6 | 8150 | 9.5 | 2.1 | 9.8 | 0.61 | 61 | 30.2 | 24.2 |
| Comparative Example 7 | 8340 | 6.4 | 0.5 | 10.4 | 0.61 | 48 | 30.2 | 22.2 |

TABLE 3-continued

|  | Gel strength (Pa) | Content of fine particles of 100 mesh or less after ball-mill pulverizing (% by weight) | Content of fine particles of 100 mesh or less after surface crosslinking (% by weight) | Powder flow ability (g/s) | Bulk density (g/ml) | Absorption rate (sec) | CRC (g/g) | AUP (g/g) |
|---|---|---|---|---|---|---|---|---|
| Comparative Example 8 | 7860 | 9.8 | 2.4 | 9.9 | 0.6 | 60 | 30.6 | 24 |
| Comparative Example 9 | 7880 | 9.9 | 2.3 | 9.9 | 0.61 | 57 | 30.7 | 24.1 |
| Comparative Example 10 | 7990 | 9.6 | 2.2 | 10.1 | 0.6 | 54 | 30.5 | 24.1 |
| Comparative Example 11 | 7830 | 6.5 | 0.3 | 9.6 | 0.61 | 58 | 31.2 | 22.6 |

As a result of the experiments, the superabsorbent polymers of Examples 1 to 8 showed bulk density and powder flowability equivalent to those of the comparative examples, while having high gel strength of 8500 Pa or more, specifically, 9000 Pa or more, and having a greatly reduced content of fine particles after surface crosslinking, and also showing more improved absorption rates while showing CRC and AUP equivalent to or higher than those of the comparative examples.

Specifically, Examples 1 and 4 including potassium hydroxide in the surface crosslinking agent showed powder characteristics and absorption performances similar to those of Comparative Examples 1 and 4 prepared in the same manner except for potassium hydroxide, while showing great improvement in terms of the absorption rate, indicating improvement of the absorption rate of the superabsorbent polymer by use of potassium hydroxide in the surface crosslinking agent.

In particular, the superabsorbent polymer of Comparative Example 4, which was prepared by using only the known chemical foaming agent without using potassium hydroxide in the surface crosslinking agent, showed an absorption rate equivalent to that of Example 1. However, after pulverizing and surface crosslinking, generation of fine particles was greatly increased, and thus the superabsorbent polymer was further deteriorated in terms of process stability. These results indicate that the absorption rate may be sufficiently improved by only using the potassium hydroxide in the surface crosslinking agent without using the chemical foaming agent, and at the same time, the problem of generating a large amount of fine particles due to the use of the chemical foaming agent may be solved.

Meanwhile, Comparative Example 2 having the same composition of the surface crosslinking agent while not satisfying the condition of the water content in the surface crosslinking solution had an excessively thin surface-crosslinked layer, and as result, its absorption rate was greatly reduced, as compared with Example 1. These results indicate that optimization of the treatment conditions of the surface crosslinking solution is required during formation of the surface-crosslinked layer in order to improve the absorption rate of the superabsorbent polymer.

Meanwhile, when Examples 2 and 3 are compared with each other, it can be seen that as the neutralization degree of the base polymer was increased, better effects in terms of absorption rate were obtained, but the content of fine particles was increased. Comparative Example 3, in which the neutralization degree of the base polymer was 76%, showed powder characteristics and absorption performance almost equivalent to those of Example 1 which was prepared under the same conditions except for the neutralization degree. However, the content of fine particles was greatly increased, and the effects of improving the absorption rate were greatly reduced.

These results indicate that the neutralization degree of the base polymer influences the absorption rate and the content of fine particles of the superabsorbent polymer, and in order to achieve a balance between the increase of the absorption rate and the decrease of the content of fine particles which have a trade-off relationship therebetween, it is necessary to optimize the neutralization degree in the base polymer.

Comparative Example 5 (a/((b×d)−c)=1.178) satisfying the composition conditions of ethylene carbonate, the polycarboxylic acid-based copolymer, and KOH while not satisfying the content conditions (0.05<a/((b×d)−c)=1) defined by Equation 1 during preparation of the surface crosslinking agent showed a great reduction in the content of fine particles of 100 mesh or less after surface crosslinking, but showed increased powder flowability and decreased gel strength, as compared with the examples, and as a result, the absorption rate of the superabsorbent polymer was greatly reduced, and CRC and AUP were also deteriorated, as compared with the examples. Comparative Example 9 (a/((b×d)−c)=0.045) showed low gel strength of 8500 Pa or less, a high content of fine particles of 100 mesh or less after pulverizing and surface crosslinking, and a great increase in the absorption rate.

Comparative Example 6 (a/c=30.6) not satisfying the content conditions (1<a/c<20) of ethylene carbonate and KOH during preparation of the surface crosslinking agent showed a reduction in powder flowability and gel strength, a great increase in the content of fine particles of 100 mesh or less after pulverizing and surface crosslinking, and a great reduction in the absorption rate of the superabsorbent polymer, as compared with the examples.

Further, Comparative Example 7 including no polycarboxylic acid-based copolymer during preparation of the surface crosslinking agent was similar to the examples in terms of the content of fine particles of 100 mesh or less after surface crosslinking, powder flowability, bulk density, and absorption rate of the superabsorbent polymer, but its absorbency under pressure was reduced.

Further, Comparative Example 8, in which the second crosslinked polymer in the prepared superabsorbent polymer had a neutralization degree of less than 70 mol % by using the base polymer having a low neutralization degree during formation of the surface-crosslinked layer and by performing surface crosslinking under conditions of forming a thick surface-crosslinked layer by increasing the use of water while reducing the input of KOH, showed reduced gel strength, a great increase in the content of fine particles of 100 mesh or less after pulverizing and surface crosslinking, slightly reduced powder flowability, and a reduced absorption rate.

Comparative Example 10, in which the molar ratio (a/c) of the ethylene carbonate (a) and potassium hydroxide (c) was less than 1 during formation of the surface-crosslinked layer, showed reduced gel strength, a great increase in the content of fine particles of 100 mesh or less after pulverizing and surface crosslinking, and a reduced absorption rate.

Further, Comparative Example 11, in which excess water was used during preparation of the surface crosslinking agent, showed reduced gel strength and a reduced absorption rate.

The invention claimed is:

1. A superabsorbent polymer comprising:
a base polymer powder comprising a first crosslinked polymer of a water-soluble ethylene-based unsaturated monomer having acidic groups which are at least partially neutralized; and
a surface-crosslinked layer which is located on the base polymer powder, and comprises a second crosslinked polymer obtained by further crosslinking the first crosslinked polymer via alkylene carbonate, and a polycarboxylic acid-based copolymer,
wherein the first crosslinked polymer has a neutralization degree of 70 mol % or less,
the second crosslinked polymer comprises acidic groups which are neutralized with potassium salts and has a neutralization degree of more than 70 mol % and less than 100 mol %, and
wherein the superabsorbent polymer has a gel strength of 8500 Pa to 10,500 Pa, as measured using a rheometer after being swollen with a 0.9 wt % physiological saline solution for 1 hour.

2. The superabsorbent polymer of claim 1, wherein the acidic groups of the first crosslinked polymer are neutralized with a basic material containing sodium, and the first crosslinked polymer comprises a sodium containing acidic group.

3. The superabsorbent polymer of claim 1, wherein the first crosslinked polymer has a neutralization degree of 50 mol % to 70 mol %.

4. The superabsorbent polymer of claim 1, wherein the alkylene carbonate is selected from the group consisting of ethylene carbonate, 4-methyl-1,3-dioxolan-2-one, 4,5-dimethyl-1,3-dioxolan-2-one, 4,4-dimethyl-1,3-dioxolan-2-one, 4-ethyl-1,3-dioxolan-2-one, 4-hydroxymethyl-1,3-dioxolan-2-one, 1,3-dioxan-2-one, 4-methyl-1,3-dioxan-2-one, 4,6-dimethyl-1,3-dioxan-2-one, and 1,3-dioxepan-2-one.

5. The superabsorbent polymer of claim 1, wherein the polycarboxylic acid-based copolymer comprises a repeating unit represented by the following Formula 1a and a repeating unit represented by the following Formula 1b, and has a weight average molecular weight of 500 g/mol to 1,000,000 g/mol:

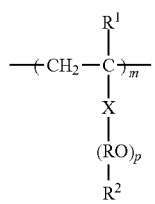

[Formula 1a]

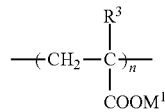

[Formula 1b]

wherein, in Formulae 1a and 1b,
$R^1$, $R^2$, and $R^3$ are each independently hydrogen or an alkyl group having 1 to 6 carbon atoms,
RO is an oxyalkylene group having 2 to 4 carbon atoms,
$M^1$ is hydrogen or a monovalent metal or non-metal ion,
X is —COO—, an alkyloxy group having 1 to 5 carbon atoms, or an alkyldioxy group having 1 to 5 carbon atoms,
m is an integer of 1 to 100,
n is an integer of 1 to 1000, and
p is an integer of 1 to 150 (when p is 2 or more, two or more repeating —RO— are the same as or different from each other).

6. The superabsorbent polymer of claim 1, wherein the surface-crosslinked layer has a thickness corresponding to 7 volume % to 20 volume % with respect to a total volume of the superabsorbent polymer.

7. The superabsorbent polymer of claim 1, wherein a bulk density is 0.4 g/ml to 0.8 g/ml, a content of fine particles of 100 mesh or less is 1% by weight or less, and an absorption rate is 20 s to 50 s.

8. The superabsorbent polymer of claim 1,
wherein a content of particles having a particle size of 150 μm to 850 μm is 99% by weight or more,
wherein the superabsorbent polymer has an absorbency under pressure (AUP) of 22 g/g to 25 g/g when measured under 0.7 psi using the 0.9 wt % physiological saline solution, and
has a centrifugation retention capacity (CRC) of 29 g/g to 33 g/g when measured using the 0.9 wt % physiological saline solution.

9. A method of preparing the superabsorbent polymer of claim 1, comprising:
performing crosslinking polymerization of the water-soluble ethylene-based unsaturated monomer having acidic groups which are at least partially neutralized, in the presence of an internal crosslinking agent, to form a water-containing gel polymer comprising the first crosslinked polymer having a neutralization degree of 70 mol % or less;
drying, pulverizing, and size-sorting the water-containing gel polymer to form the base polymer powder; and
reacting the base polymer powder with a surface crosslinking solution which is prepared by dissolving a surface crosslinking agent comprising potassium hydroxide, the alkylene carbonate, and the polycarboxylic acid-based copolymer in water to form the surface-crosslinked layer comprising the second crosslinked polymer obtained by further crosslinking the first crosslinked polymer on the surface of the base polymer powder via the alkylene carbonate,
wherein the water is used in an amount of 2.5 parts by weight to 10 parts by weight, with respect to 100 parts by weight of the base polymer powder, and
the potassium hydroxide, the alkylene carbonate, and the polycarboxylic acid-based copolymer are used in amounts satisfying the conditions of the following Equation 1:

$$0.05 < a/((b \times d) - c) \leq 1$$  [Equation 1]

wherein, in Equation 1, a is a number of moles of the alkylene carbonate to be used, b is a number of moles of acidic group present in the first crosslinked polymer, c is a number of moles of the potassium hydroxide to be used, and d is a volume ratio of the surface-crosslinked layer with respect to a total volume of the superabsorbent polymer, provided that a and c satisfy the condition of 1<a/c<20.

10. The method of claim 9, wherein a/((b×d)−c) of Equation 1 is 0.1 or more and 0.5 or less, and a/c is 2 or more and 18 or less.

11. The method of claim 9, wherein the volume ratio of the surface-crosslinked layer is 0.07 to 0.2 with respect to the total volume of the superabsorbent polymer.

12. The method of claim 9, wherein the polycarboxylic acid-based copolymer is comprised in an amount of 0.01 parts by weight to 0.5 parts by weight with respect to 100 parts by weight of the base polymer powder.

13. The method of claim 9, wherein the alkylene carbonate is comprised in an amount of 0.2 parts by weight to 5 parts by weight with respect to 100 parts by weight of the base polymer powder.

14. The method of claim 9, wherein the potassium hydroxide is comprised in an amount of 0.01 parts by weight to 2 parts by weight with respect to 100 parts by weight of the base polymer powder.

15. The method of claim 9, wherein a foaming agent is further introduced during formation of the water-containing gel polymer.

* * * * *